United States Patent [19]

Rogers et al.

[11] Patent Number: 5,707,525

[45] Date of Patent: *Jan. 13, 1998

[54] PROCESS FOR SEPARATING AND RECOVERING AN ANIONIC DYE FROM AN AQUEOUS SOLUTION

[75] Inventors: Robin Rogers, DeKalb; E. Philip Horwitz, Naperville, both of Ill.; Andrew H. Bond, Tallahassee, Fla.

[73] Assignees: Arch Development Corp., Chicago; Northern Illinois University, DeKalb, both of Ill.

[*] Notice: The term of this patent shall not extend beyond the expiration date of Pat. No. 5,603,834.

[21] Appl. No.: 655,251

[22] Filed: Jun. 5, 1996

Related U.S. Application Data

[63] Continuation-in-part of Ser. No. 477,330, Jun. 7, 1995, Pat. No. 5,603,834, and Ser. No. 478,382, Jun. 7, 1995.

[51] Int. Cl.$^6$ .................................................. B01D 15/08
[52] U.S. Cl. .................... 210/635; 210/634; 210/198.2; 210/502.1
[58] Field of Search ................................ 210/634, 638, 210/639, 656, 198.2, 635, 660, 263, 502.1; 423/7, 8, 11; 422/70

[56] References Cited

U.S. PATENT DOCUMENTS

| | | | |
|---|---|---|---|
| 4,980,065 | 12/1990 | Hsu | 210/634 |
| 5,078,886 | 1/1992 | Hsu | 210/635 |
| 5,603,834 | 2/1997 | Rogers | 210/634 |

OTHER PUBLICATIONS

Bayer et al., "Polystyrene–Immobilized PEG Chains", *Poly-(Ethylene Glycol) Chemistry: Biotechnical and Biomedical Applications;* Harris, ed., Plenum Press, New York, Chapter 20:325–345 (1992).
Regen et al., *J. Am. Chem. Soc.*, 101:116 (Jan. 1979).
Yanagida et al., *J. Org. Chem.*, 44:1099 (Mar. 1979).
Fukunishi et al., *J. Org. Chem.*, 46:1218 (Mar. 1981).
Kimura et al., *Synth. Commun.*, 13:443 (Apr. 1983).
Kimura et al., *J. Org. Chem.*, 48:195 (Jan. 1983).
Jones et al., *Anal. Chim. Acta*, 182:61 (Apr. 1986).
Fong et al., *Talanta*, 39:825 (Jul. 1992).
Herren et al., *J. Coll. Interf. Sci.*, 115:46 (Jan. 1987).
Matsumoto et al., *J. Chromatogr.*, 187:351 (Jan. 1980).
Matsumoto et al., *J. Chromatogr.*, 268:375 (Oct. 1983).
Matsumoto et al., *J. Chromatogr.*, 285:69 (Feb. 1984).
Rogers et al., *Sep. Sci. Technol.*, 28:1091 (Apr. 1993).
Marcus, Yizhak, "Thermodynamics of Solvation of Ions", *J. Chem. Soc. Faraday Trans.*, 87:2995–2999 (Sep. 1991).
Heffernan et al., *J. Chem. Soc., Perkin Trans.* 2, 514 (Mar. 1981).
Rogers et al., "Value Adding Through Solvent Extraction", *Proceedings of ISEC '96*, Shallcross et al. eds., The University of Melbourne, Parkville, Victoria, Australia, vol. 2:1537–1542 (Mar. 1996).
Gagnon et al., *BioPharm*, 9:54, 56, 58–62 (May 1996).
Collins et al., *Quart. Rev. BioPhysics*, 18(4):323–326 (1985).

(List continued on next page.)

*Primary Examiner*—Ernest G. Therkorn
*Attorney, Agent, or Firm*—Welsh & Katz, Ltd.

[57] ABSTRACT

A solid/liquid phase process for the separation and recovery of an anionic dye from an aqueous solution is disclosed. The solid phase comprises separation particles having surface-bonded poly(ethylene glycol) groups, whereas the aqueous solution from which the anionic dye molecules are separated contains a poly(ethylene glycol) liquid/liquid biphase-forming amount of a dissolved lyotropic salt. After contact between the aqueous solution and separation particles, the anionic dye is bound to the particles. The bound anionic dye molecules are freed from the separation particles by contacting the anionic dye-bound particles with an aqueous solution that does not contain a poly(ethylene glycol) liquid/liquid biphase-forming amount of a dissolved lyotropic salt to form an aqueous anionic dye solution whose anionic dye concentration is preferably higher than that of the initial dye-containing solution.

12 Claims, 7 Drawing Sheets

OTHER PUBLICATIONS

Voet, *Chem. Rev.*, 20:169–179 (1937).

Rogers et al., *Solvent Extr. Ion Exch.*, 13:655–688 (Jul. 1995).

Rogers et al., *Solvent Extr. Ion Exch.*, 13:689–713 (Jul. 1995).

Rogers et al., *Aqueous Biphasic Separations: Biomolecules to Metal Ions*, Rogers and Eiteman, eds., Plenum (New York: 1995) pp. 1–20.

Rassi, *J. Chromatography A*, 720:93–118 (1996).

PROCESS FOR SEPARATING AND RECOVERING AN ANIONIC DYE FROM AN AQUEOUS SOLUTION

CROSS-REFERENCE TO RELATED APPLICATIONS

This is a continuation-in-part of application Ser. No. 08/477,330, filed on Jun. 7, 1995, now U.S. Pat. No. 5,603,834, and Ser. No. 08/478,382, filed on Jun. 7, 1995, whose disclosures are incorporated herein by reference.

GOVERNMENTAL SUPPORT AND RIGHTS

This invention was made with government support pursuant to Contract No. W-31-109-ENG-38 between the U.S. Department of Energy and The University of Chicago, contractor for Argonne National Laboratory, and National Science Foundation Grant CTS-9207264. The United States Government has certain rights in this invention.

TECHNICAL FIELD

The present invention relates to the separation, concentration and recovery of anionic dye molecules from an aqueous solution in a solid/liquid separation process such as a chromatographic process.

BACKGROUND ART

Solid support-based chromatographic methods have been extensively applied in separation science for many years. [Harris, *Quantitative Chemical Analysis*, 2nd ed., W. H. Freeman and Co., New York (1987); Skoog, *Principles of Instrumental Analysis*, 3rd ed., Saunders College Publishing, New York (1985); Giddings, *Unified Separation Science*, John Wiley & Sons, New York, (1991)] Excellent chemical separations can be achieved due to the inherent variables of solid/liquid chromatography [Skoog, *Principles of Instrumental Analysis*, 3rd, ed., Saunders College Publishing, New York (1985)] that include the ability to vary both the support material and mobile phase. Several advantages over solvent extraction include the immobilization of the extractant and the absence (or decreased need in the case of extraction chromatography) of organic solvent diluents. As for solvent extraction, scale-up of solid support-based chromatographic methods is feasible with the major concern of the pressure drop across a large column balanced by the simplicity of the chromatographic apparatus versus liquid/liquid contactor apparatus.

Due to the rich history of liquid/liquid aqueous biphasic separations for biological separations, [*Poly(Ethylene Glycol) Chemistry: Biotechnical and Biomedical Applications*, Harris, ed., Plenum Press, New York (1992); *Aqueous Two-Phase Systems*, Walter and Johansson, eds., in *Methods in Enzymology*, Academic Press, San Diego, Vol. 228 (1994); Albertsson, *Partition of Cell Particles and Macromolecules*, 3rd ed., John Wiley & Sons, New York (1986); *Partitioning in Aqueous Two-Phase Systems: Theory, Methods, Uses and Applications to Biotechnology*, Walter, Brooks and Fisher, eds., Academic Press, Orlando (1991)] work on solid-supported biphasic separations has focused on biological species.

The major variables influencing liquid/liquid aqueous biphasic separations, type and concentration of polymer and salt and polymer molecular weight, are important variables to consider in the design of aqueous biphasic chromatographic materials. A current focus is on anionic dye separations from solutions of high ionic strength because most dye-containing waste streams have relatively high concentrations of matrix ions.

Dye waste streams can no longer be disposed of by dilution into natural waters or sewage systems because of the biological damage or fouling of the treatment processes that may occur. Presently, low concentrations of dyes are removed by relatively inefficient techniques that include reverse osmosis and/or adsorption on activated charcoal. In this treatment scheme the dyes cannot be recycled, are treated as solid wastes and are landfilled.

Examination of the salts that induce aqueous liquid/liquid biphase formation of poly(ethylene glycol) (PEG) solutions has indicated that those salts are among the materials referred to in the art as lyotropic or lyotropic agents. Such salts tend to structure water, and the structure provided to the water by a lyotropic salt is thought to cause salting out of the PEG phase. PEG compounds are provided as mixtures having the average molecular weight of a number that follows the word "PEG" so that PEG-2000, for example, is a mixture of polymer molecules whose average molecular weight is 2000.

Two major drawbacks to aqueous biphasic separations operating in the liquid/liquid mode are loss of the phase-forming components, PEG or salt, due to their high solubilities in water and the difficulty in stripping partitioned solutes. Because high concentrations of the phase-forming components are required to sustain a two-phase system, any loss of PEG or salt is of concern.

More importantly, once the solute of interest has been partitioned to the upper PEG-rich phase of an aqueous liquid/liquid biphase, its isolation from this matrix has proven to be difficult. Thus, once the dye is separated and concentrated in the PEG-rich phase, the dye cannot be readily removed.

Thus, Rogers et al., in "Value Adding Through Solvent Extraction", *Proceedings of ISEC '96*, Shallcross et al. eds., The University of Melbourne, Parkville, Victoria, Australia, Vol. 2:1537–1542 (1996) reported upon the partitioning of several dyes between PEG- and salt-rich phases of lyotropic solutions. Those workers reported partitioning of acid (anionic), basic (cationic) and electrically neutral dyes from a saturated dye solution between salt- and PEG-rich layers using ammonium sulfate and 40 weight percent PEG-2000.

More specifically, those workers reported, inter alia, that anionic dyes such as Chicago Sky Blue 6B [*Color Index* (C.I.) 24410, Direct Blue 1], Direct Blue 71 (C.I. 23655), Primuline (C.I. 49000, Direct Yellow 59) and Cibacron® Brilliant Red 3B-A (C.I. 18105, Reactive Red 4), cationic dyes such as Safranine O (C.I. 50240), Auramine O (C.I. 41000, Basic Yellow 2), Chrysoidin (C.I. 11270, Basic Orange 2) and Victoria Blue B (C.I. 44045, Basic Blue 26), and electrically neutral (uncharged) dyes such as Indigo (C.I. 73000, Indigo Blue, Vat Blue 1) and Rhodanine (2-thioxo-4-thiazolidinone) partitioned almost quantitatively to the PEG phase in both acid (pH about 1.5–1.7) and base (pH about 9.6–9.8) conditions. Conversely, Methylene Blue (C.I. 50215, Basic Blue 9), a cationic dye, Xylenol Orange sodium salt, a sulfonate/carboxylate dye and Arsenazo III, an arsenate/sulfonate dye partitioned at least to some degree into the salt-rich phase, whereas Propyl Astra Blue Iodide, a cationic copper-phthalocyannine-type dye remained primarily in the salt-rich phase.

Polyethylene glycols have been bound to a variety of different materials, with the choice of support based primarily on the desired application. Solid-supported short chain PEGs have been grafted to styrene-based resins for use as phase transfer catalysts in organic synthesis, [Regen et al., *J. Am. Chem. Soc.*, 101:116 (1979); Yanagida et al., *J. Org. Chem.*, 44:1099 (1979); Fukunishi et al., *J. Org. Chem.*, 46:1218 (1981); Heffernan et al., *J. Chem. Soc., Perkin Trans.* 2:514 (1981); Kimura et al., *Synth. Commun.*, 13:443 (1983); Kimura et al., *J. Org. Chem.*, 48:195 (1983)] and to urethane foams to act as potential metal ion chelators. [Jones et al., *Anal. Chim. Acta*, 182:61 (1986); Fong et al., *Talanta*, 39:825 (1992)] Polyethers have also been bound to various surfaces to decrease protein adhesion in biomedical applications [Nagaoka et al., *Antithrhombogenic Biomedical Material*, Toray Industries, Inc. (1983); Toyobo Co., *Antithrhombogenic Membranes*, Toyobo Co. (1983)] and medium molecular weight PEGs have been fused to silica capillaries for a variety of separations. [Nashabeh et al., *J. Chromatogr.*, 559:367 (1991); Herren et al., *J. Coll. Interf. Sci.*, 115:46 (1987)] High molecular weight PEGs have been bound to silica [Matsumoto et al., *J. Chromatogr.*, 187:351 (1980)] and Sepharose [Matsumoto et al., *J. Chromatogr.*, 187:351 (1980); Matsumoto et al., *J. Chromatogr.*, 268:375 (1981); Matsumoto et al., *J. Chromatogr.*, 285:69 (1984)] primarily for polymer/polymer separations of biomolecules. Two recent reviews of PEG chemistry also point to the utility of solid-supported PEGs for bioanalytical separations. [*Poly(Ethylene Glycol) Chemistry: Biotechnical and Biomedical Applications*, Harris, ed., Plenum Press, New York (1992); *Aqueous Two-Phase Systems*, Walter et al., eds., in *Methods in Enzymology* Academic Press, San Diego, 228 (1994)]

It would therefore be beneficial if the selective binding of anionic dyes to PEG resins found in aqueous biphasic separations could be adapted to a solid support-based separation and recovery process, while at the same time overcoming the problems inherent in recovering the dyes from an aqueous biphasic separation system. The discussion that follows provides one solution to the anionic dye recovery problem for substantially every water-soluble anionic dye, and particularly those dyes that have a plurality of substituent sulfonic acid/sulfonate groups.

BRIEF SUMMARY OF THE INVENTION

The present invention relates to a separation and recovery process that effectively separates and recovers anionic dye molecules from an aqueous solution containing lyotropic ions. Where the initial dye-containing solution is dilute, e.g. about $10^{-3}$–$10^{-6}$ molar or less, a more concentrated solution of the recovered dye can be obtained.

In one embodiment, a process for separating and recovering anionic dyes from an aqueous solution is contemplated. That process comprises the steps of:

(a) contacting separation particles with an aqueous solution containing (i) an anionic dye and (ii) a poly(ethylene glycol) liquid/liquid biphase-forming amount of a dissolved salt (lyotropic) to form a solid/liquid phase admixture. The anionic dye contains one, and preferably at least two, 5- or 6-membered aromatic rings and at least one substituent group having a $pK_a$ value equal to, or preferably, one unit below the pH value of the aqueous solution. The separation particles comprise particles having a plurality of covalently bonded —X—$(CH_2CH_2O)_n$—$CH_2CH_2R$ groups wherein X is O, S, NH or N—$(CH_2CH_2O)_m$—$R^3$ where m is a number having an average value of zero to about 225, n is a number having an average value of about 15 to about 225, $R^3$ is hydrogen, $C_1$–$C_2$ alkyl, 2-hydroxyethyl or $CH_2CH_2R$, and R is selected from the group consisting of —OH, $C_1$–$C_{10}$ hydrocarbyl ether having a molecular weight up to about one-tenth that of the —$(CH_2CH_2O)_n$— portion, carboxylate, sulfonate, phosphonate and —$NR^1R^2$ groups where each of $R^1$ and $R^2$ is independently hydrogen, $C_2$–$C_3$ hydroxyalkyl or $C_1$–$C_6$ alkyl, or —$NR^1R^2$ together form a 5- or 6-membered cyclic amine having zero or one oxygen atom or zero or one additional nitrogen atom in the ring. The separation particles have a percent $CH_2O/mm^2$ of particle surface area of greater than about 8000 and less than about 1,000,000.

(b) That contact is maintained for a time period sufficient to form anionic dye-bound separation particles and an aqueous solution having a reduced concentration of anionic dye.

(c) The anionic dye-bound separation particles are contacted with a second aqueous solution that does not contain a poly(ethylene glycol) liquid/liquid biphase-forming amount of dissolved lyotropic salt to free the anionic dye molecules from the separation particles and form an aqueous solution containing free anionic dye molecules that is preferably at a higher concentration than that of the first-named aqueous solution of step (a).

(d) The free anionic dye-containing aqueous solution of the above step is then recovered.

In preferred practice, the anionic dye-bound separation particles (solid phase) are separated from the aqueous solution (liquid phase) of step (b) in the presence of an aqueous solution of a poly(ethylene glycol) liquid/liquid biphase-forming amount of a lyotropic salt to form a second solid/liquid phase admixture containing anionic dye-bound separation particles.

The anionic dye can contain one or more substituent anionic groups, such as arsenate, phosphonate, carboxylate and sulfonate groups, when named as an anion. The presence of at least one sulfonate substituent is particularly preferred.

BRIEF DESCRIPTION OF THE DRAWINGS

In the drawings forming a portion of this disclosure.

Figure 1:
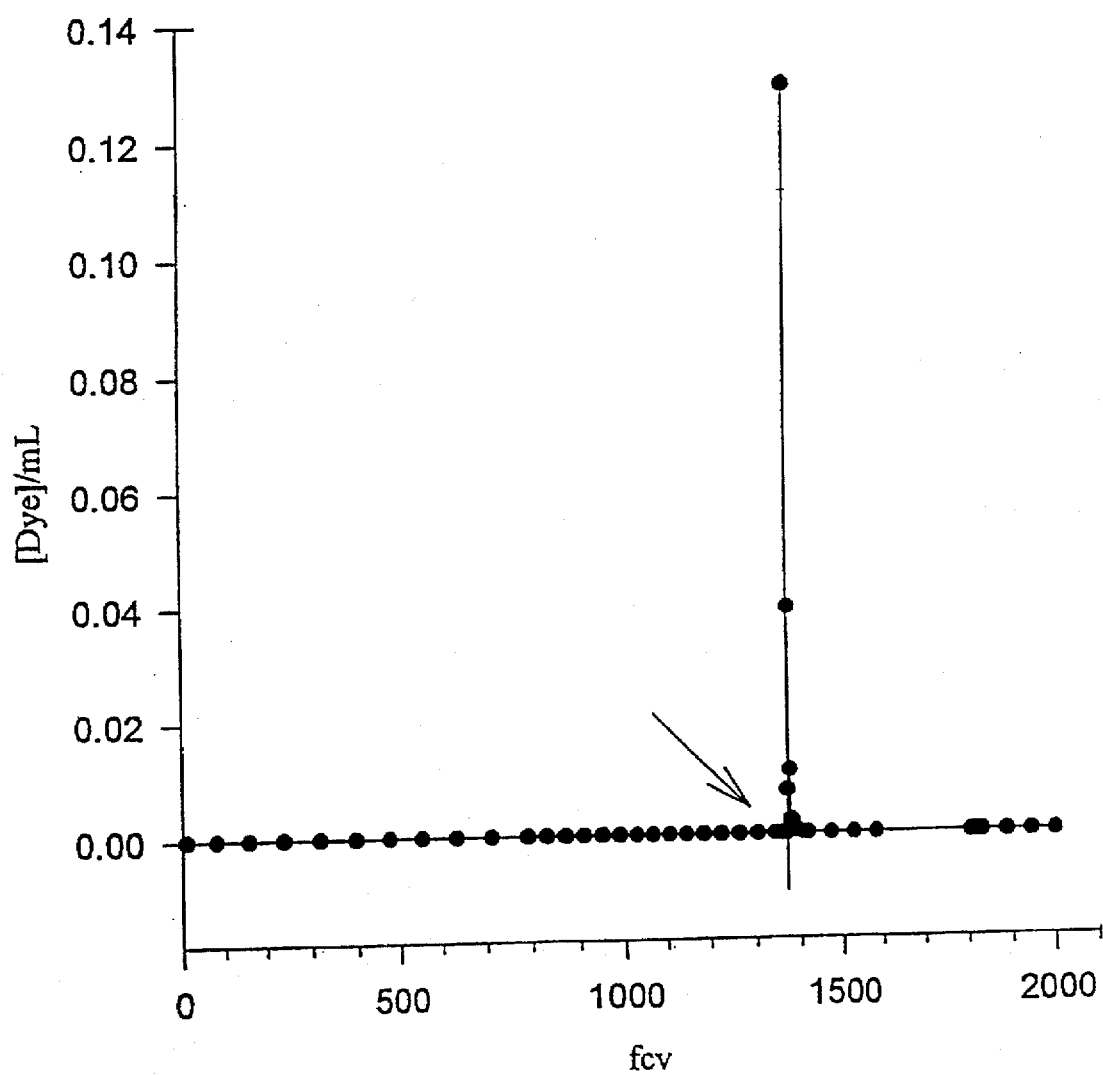
FIG. 1 is a graph illustrating the loading, rinsing and elution (stripping); i.e., the separation, concentration and recovery, of Reactive Blue 4 (C.I. 61205) dye molecules initially present at a concentration of $2.304 \times 10^{-3}$M in aqueous 1.5M $(NH_4)_2SO_4$ solution using ABEC-5K separation particles. Rinsing with an aqueous solution of 3M $(NH_4)_2SO_4$ is indicated by the arrow at approximately 1300 fcv, whereas stripping with distilled water is noted by the vertical line at about 1380 fcv. The ordinate is in units of moles of dye per liter per milliliter of eluate ([Dye]/mL), whereas the abscissa is in units of free column volumes (fcv).
Figure 2:
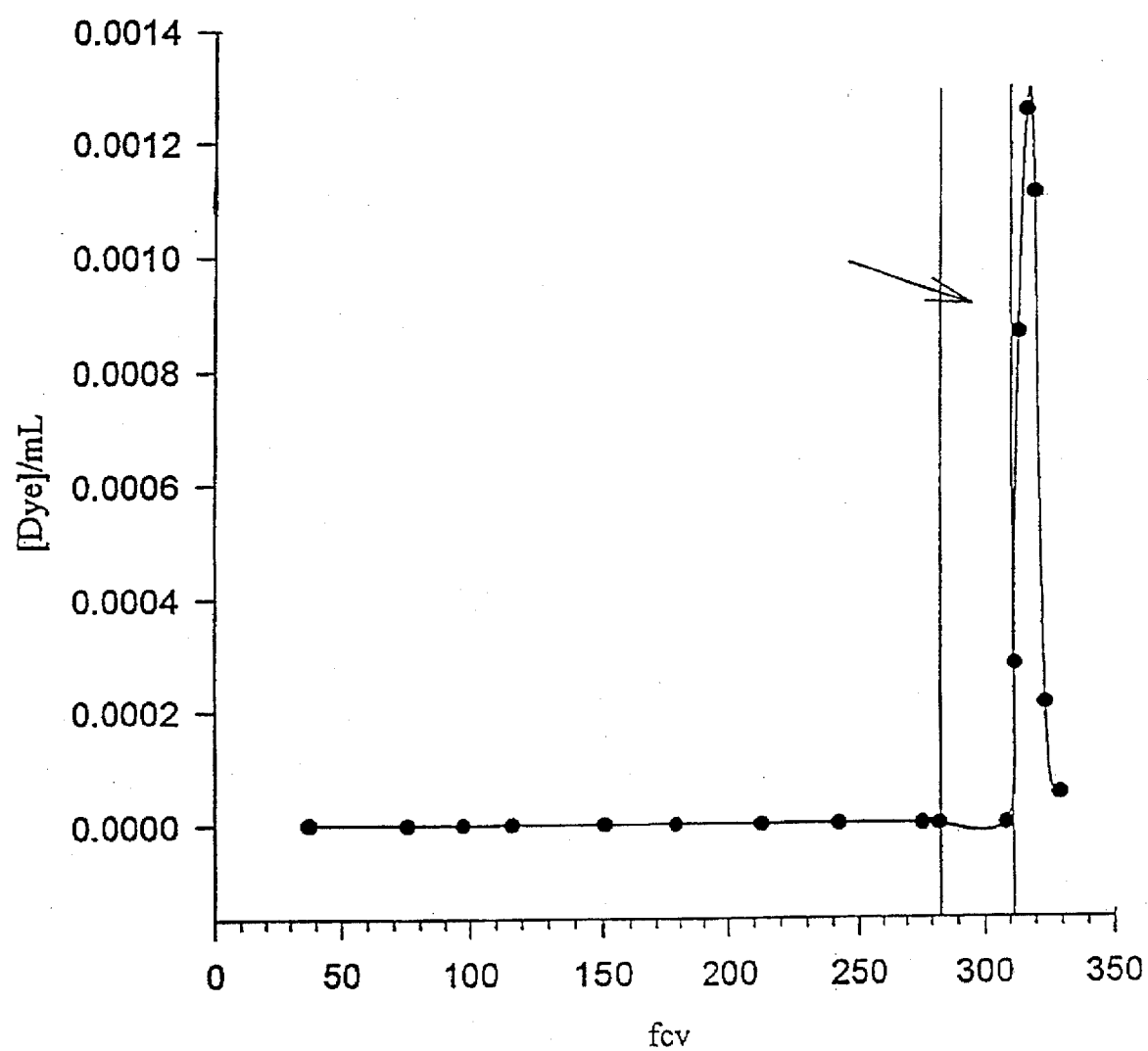
FIG. 2 is a graph similar to FIG. 1 showing data for the separation, concentration and recovery of Reactive Blue 4 dye molecules initially present at a concentration of $1.017 \times 10^{-4}$M in aqueous 5M $NH_4Cl$ using ABEC-5K separation particles. Rinsing using an aqueous 5M $NH_4Cl$ solution was carried out between about 283 and 311 fcv with a water strip being used between about 311 fcv, and 330 fcv. The ordinate and abscissa are as in FIG. 1.
Figure 3:
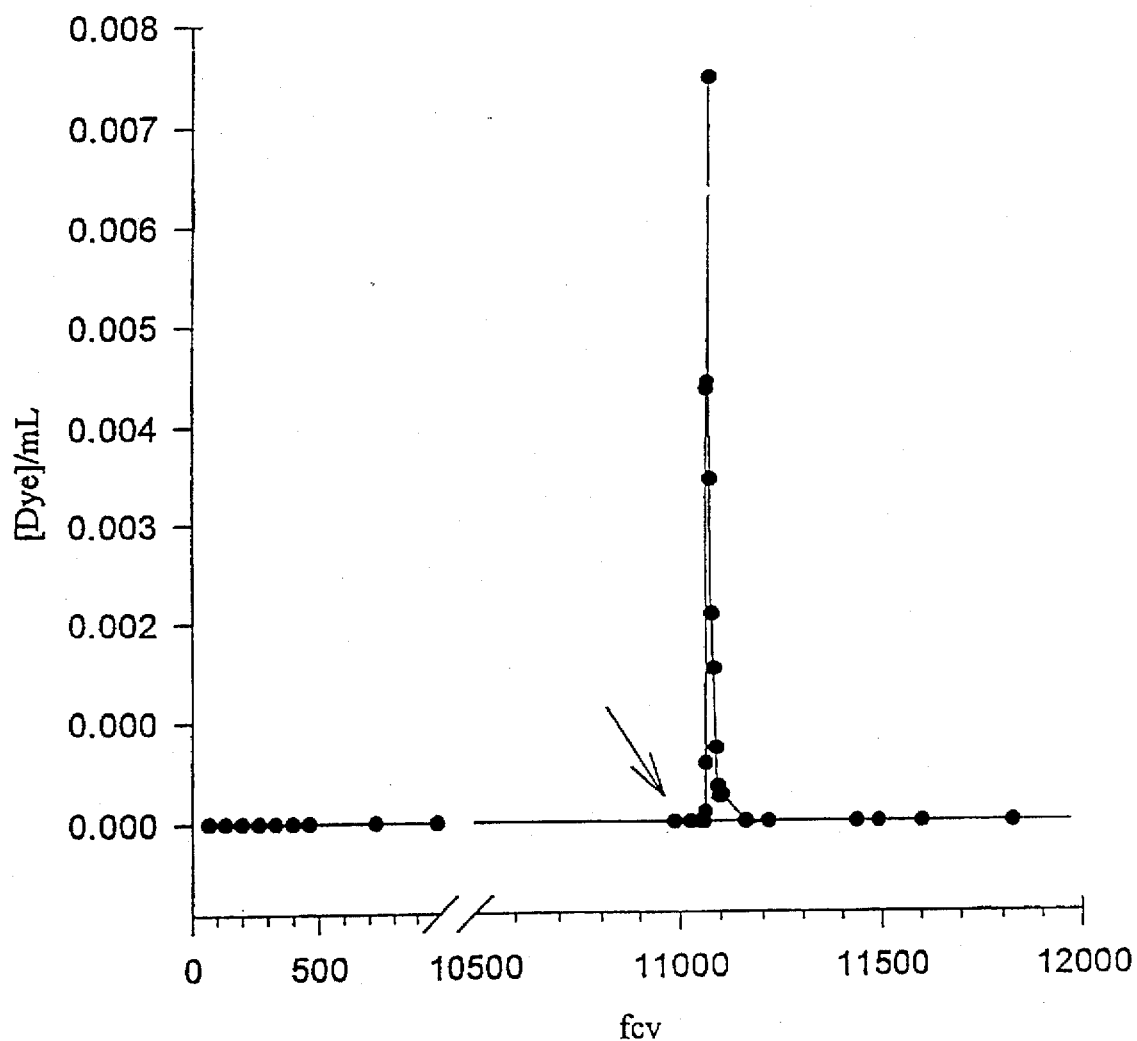
FIG. 3 is a graph similar to FIG. 1 showing data for the separation, concentration and recovery of Acid Red 92 (C.I. 45410) present initially at $1.22 \times 10^{-5}$M in aqueous 1.5M $(NH_4)_2SO_4$ solution using ABEC-5K separation particles. A rinse with aqueous 3M $(NH_4)_2SO_4$ is indicated by the arrow at about 11,000 fcv, with a water strip occurring at about 11,050 to about 11,150 fcv. The ordinate and abscissa are as in FIG. 1.
Figure 4:
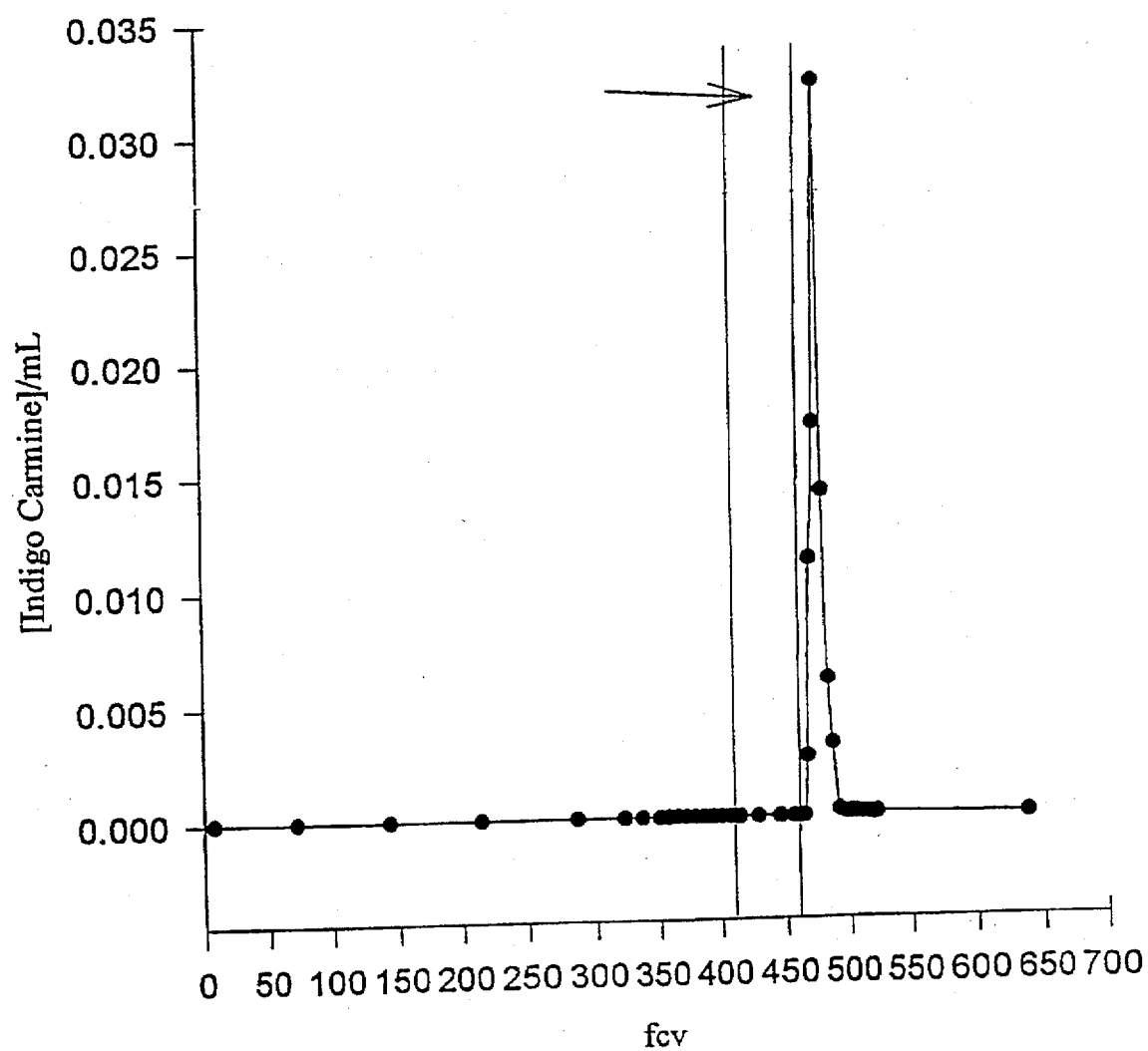
FIG. 4 is a graph similar to FIG. 1 showing data for the separation, concentration and recovery of Indigo Carmine (Acid Blue 74; C.I. 73015) initially present at $2.342 \times 10^{-4}$M in aqueous 1.5M $(NH_4)_2SO_4$ using ABEC-5K separation particles. A rinsing step using aqueous 3M $(NH_4)_2SO_4$ is shown by the vertical lines between about 410 and 460 fcv, with a distilled water strip occurring between about 460 and 490 fcv. The ordinate and abscissa are as in FIG. 1.
Figure 5:
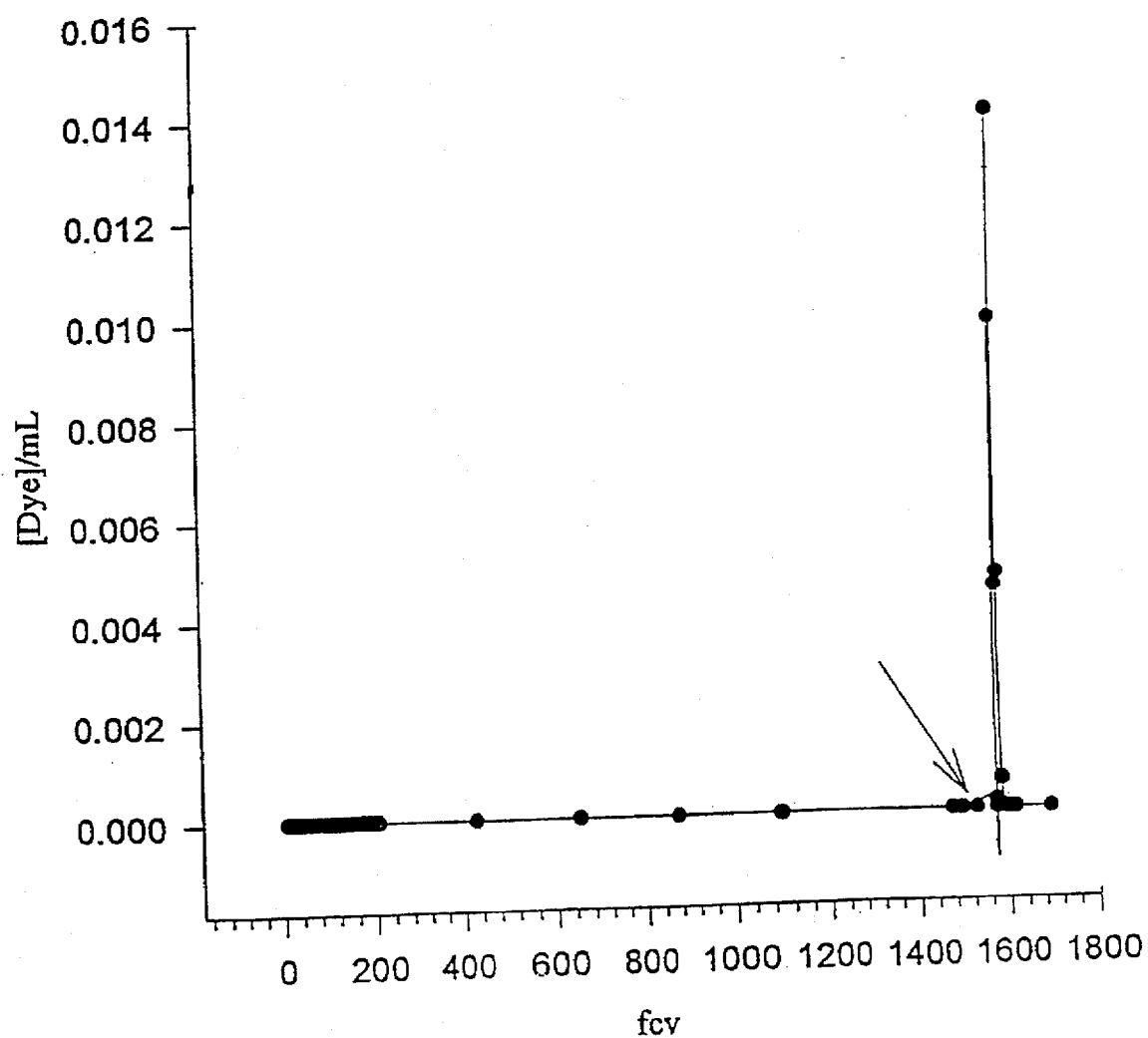
FIG. 5 is another graph similar to FIG. 1 showing data for the separation, concentration and recovery of Cibacron® Brilliant Red 3B-A (Reactive Red 4; C.I. 18105) initially present at $5.388 \times 10^{-5}$M in aqueous 1.5M $(NH_4)_2SO_4$ using ABEC-5K separation particles. A rinsing step using aqueous 3M $(NH_4)_2SO_4$ is indicated by the arrow at about 1500 fcv, and is followed by a water stripping step at about 1560 to 1580 fcv. The ordinate and abscissa are as in FIG. 1.

The present invention has several benefits and advantages.

One salient benefit of the invention is that a contemplated process can concentrate a dilute dye bath by a factor of ten-fold or more.

An advantage of a contemplated process is that it can be used to free an aqueous dye solution of impurities such as dye precursors and reaction products.

Another benefit of the invention is that a concentrated aqueous dye solution formed by a contemplated process can be used to recycle the dye for further use so that less waste dye is created.

Another advantage of a contemplated process is that where the produced concentrated dye solution is a waste to be disposed of, that waste solution is more concentrated than is a usually encountered waste and is consequently more easily dealt with.

A still further benefit of the invention from a waste standpoint is that a produced concentrated dye solution can contain the dye in water containing virtually no salts so that salts usually present in the waste stream are not a further source of pollution.

Still further benefits and advantages of the invention will be apparent to a skilled worker from the description that follows.

DETAILED DESCRIPTION OF THE INVENTION

It has now been found that the benefits of PEG-induced anionic separations observed in liquid/liquid separations of anionic, cationic and nonionic dyes can be had for anionic dyes in a solid support-based solid/liquid phase separation process in which particular PEGs are bonded to solid particles. It has also surprisingly been found that separated anionic dye molecules can be readily recovered from the solid-supported PEG resin by elution with water, thereby overcoming the major drawback of the liquid/liquid separation process. Still more surprising is the fact that the distribution factor for a separated dye molecule $D_w$, can be about an order of magnitude or more greater in the solid/liquid phase process than in the liquid/liquid process.

The Process

In accordance with a process of this invention, separation and recovery of anionic dye molecules from an aqueous solution containing a lyotropic salt is contemplated.

A contemplated process comprises the steps of:

(a) contacting separation particles with an aqueous solution containing (i) an anionic dye and (ii) a poly (ethylene glycol) liquid/liquid biphase-forming amount of a dissolved salt (lyotropic) to form a solid/liquid phase admixture. The anionic dye contains one, and preferably at least two, 5- or 6-membered aromatic rings and at least one substituent group having a $pK_a$ value that is equal to, or preferably at least one unit below, the pH value of the aqueous solution. The separation particles comprise particles having a plurality of covalently bonded —X—$(CH_2CH_2O)_n$—$CH_2CH_2R$ groups wherein X is O, S, NH or N—$(CH_2CH_2O)_m$—$R^3$ where m is a number having an average value of zero to about 225, n is a number having an average value of about 15 to about 225, $R^3$ is hydrogen, $C_1$–$C_2$ alkyl, 2-hydroxyethyl or $CH_2CH_2$R, and R is selected from the group consisting of —OH, $C_1$–$C_{10}$ hydrocarbyl ether having a molecular weight up to about one-tenth that of the —$(CH_2CH_2O)_n$— portion, carboxylate, sulfonate, phosphonate and —$NR^1R^2$ groups where each of $R^1$ and $R^2$ is independently hydrogen, $C_2$–$C_3$ hydroxyalkyl or $C_1$–$C_6$ alkyl, or —$NR^1R^2$ together form a 5- or 6-membered cyclic amine having zero or one oxygen atom or zero or one additional nitrogen atom in the ring. The separation particles have a percent $CH_2O/mm^2$ of particle surface area of greater than about 8000 and less than about 1,000,000.

(b) That contact is maintained for a time period sufficient to form anionic dye-bound separation particles and an aqueous solution having a reduced concentration of anionic dye.

(c) The anionic dye-bound separation particles are contacted with a second aqueous solution that does not contain a poly(ethylene glycol) liquid/liquid biphase-forming amount of dissolved lyotropic salt to free the anionic dye molecules from the separation particles and form an aqueous solution containing free anionic dye molecules that is preferably at a higher concentration than that of the first-named aqueous solution of step (a).

(d) The free anionic dye-containing aqueous solution of the above step is then recovered.

Turning more specifically to the process and its constituent materials and manipulations, one notes that separation particles are utilized. These separation particles are particles that are hydrophilic and include poly(ethylene glycol) groups of a particular length and therefore molecular weight as is discussed hereinafter.

The particles can be quite varied in make-up, are inert to (do not noticeably react with) and are insoluble in the separation/recovery aqueous salt biphase-forming environment that can be very acidic or basic. Exemplary preferred particles are the particularly preferred reacted cross-linked poly(styrene-vinyl benzyl halide) resins often called Merrifield's peptide resin or halomethylated (e.g., chloromethylated or bromomethylated) divinylbenzene cross-linked polystyrene, as well as glass or silica gel (silica-based) materials, cross-linked poly(ethylene glycol)-containing urethane or urea resins, cross-linked dextran- and agarose-based materials, and also various cross-linked acrylate esters.

It is noted that the separation particles can contain some reactive functionality such as benzyl halide groups that can react in the aqueous biphase-forming environment. However, any such reaction is minimal and does not alter the properties of the separation particles. Such separation particles are then deemed to be "inert" to their environment for the purpose of a separation and recovery as described herein.

As noted before, the cross-linked, styrene/halomethylstyrene-based Merrifield's peptide resins are particularly preferred. These materials are available from a number of commercial sources such as Sigma Chemical Co., St. Louis, Mo. in several sizes and having differing amounts of cross-linking and differing amounts of replaceable chloride ion. The preparation of exemplary resins is also detailed hereinafter. Preferred commercially available materials are 200–400 mesh particles that contain about 0.4–0.9 meq chlorine/gram or about 0.9–1.5 meq chlorine/gram at one percent cross-linking and a material containing about 1 meq chlorine/gram at two percent cross-linking.

Another similar group of cross-linked styrene/halomethylstyrene-based resin particles are the so-called macroreticular resin particles. An exemplary material is commercially available from Sybron Chemicals, Inc., of Birmingham, N.J. and contains 6 percent cross-links with a particle size of about 20–50 mesh. Weight conversion factors (WCFs, discussed hereinafter) for separation particles prepared from the commercially available material and another batch prepared in the laboratory were about 0.78 and 0.64, respectively.

Still another group of cross-linked styrene/halomethylstyrene-based resins are so-called xero-gel resin particles that have pore properties intermediate between the Merrifield type and macroreticular resins. The initial resin particles are swellable in toluene, but are insoluble in water and methanol, as are the separation particles prepared therefrom. Typically, resins are prepared from about 70–75 parts by weight styrene, about 15–20 parts by weight vinylbenzyl chloride and about 0.5–5 parts by weight divinyl benzene as cross-linker. An exemplary batch of separation particles having 1 percent cross-linker had a mesh size of 40–60 and a WCF of about 0.12. These separation particles are also particularly preferred as their relatively large particle sizes permit faster flow rates than do the smaller-sized Merrifield resin-based separation particles.

These resin particles are typically prepared by suspension polymerization using a diluent solvent such as toluene that dissolves the monomers and swells the polymerized resin. Macroreticular resin particles are typically prepared using a similar polymerization but using a diluent solvent that dissolves the monomers but does not swell the polymerized resin.

Another useful group of similar resin particles from which separation particles can be prepared are so-called gel resins. These materials contain the same ingredients as the xero-gel particles except that no diluent solvent is utilized during the suspension polymerization of the particle monomers.

Merrifield's peptide resin particles or the similar macroreticular, xero-gel or gel resin particles are readily transformed into separation particles by reaction in a solvent inert to the reaction conditions with an alkali metal salt of a desired long chain PEG compound, followed by rinsing to remove any unreacted materials and the alkali metal halide reaction product. The PEG-containing separation particles are therefore referred to as "reacted".

A Merrifield's peptide resin can also first be reacted with a shorter PEG compound such as tetraethylene glycol followed by reaction with ethylene oxide to extend the chains. One such synthetic process is described in Bayer et al., *Poly(Ethylene Glycol) Chemistry: Biotechnical and Biomedical Applications*, Harris, ed., Plenum Press, New York (1992) p. 325. A similar reaction can be carried out using an alkanol amine such as mono- or diethanolamine followed by a chain lengthening reaction with ethylene oxide. An aminomethyl Merrifield's peptide resin (Sigma) can similarly be reacted with ethylene oxide to form desired, amine-containing separation particles. Similar reactions using sodium sulfide and then ethylene oxide or 2-mercaptoethanol and then ethylene oxide can be used to form sulfur-containing separation particles.

Another group of solid support particles are cross-linked acrylic esters, particularly those having about 60 to about 98 weight percent glycidyl methacrylate with the remaining amount of monomer being cross-linking agent, and methyl methacrylate. Methyl methacrylate at about 68 to about 48 weight percent, a cross-linker and about 30 to about 50 weight percent of a PEG-750 to -5000 methacrylate ester whose PEG portion has a formula —O—(CH$_2$CH$_2$O)$_n$—CH$_2$CH$_2$R as is discussed hereinafter can also be copolymerized.

Exemplary cross-linking agents for acrylate-based particles include trimethylolpropane trimethacrylate [2-ethyl-2 (2-hydroxymethyl)-1,3-propanediol trimethacrylate], pentaerythritol triacrylate and the like as are well known. A cross-linking agent is typically used at about 1 to about 5 weight percent and more preferably at about 2 to about 4 weight percent of the monomer mixture.

Support particles containing polymerized glycidyl methacrylate repeating units are post-reacted with an appropriate PEG compound to open the epoxy ring to form an ester-linked hydroxy-ether separation particle. Support particles containing PEG ester groups are simply copolymerized with the other ingredients.

Glass-(silica-)based separation particles are also useful herein. These materials typically contain an amine group that is reacted with ethylene oxide or with an epichlorohydrin/PEG compound reaction product to form the desired separation particles.

For example, four aminopropyl controlled pore glass products having different pore sizes are available from Sigma Chemical Co., St. Louis, Mo. These materials are said to have 150–250 μmoles at 200–400 mesh down to 40–100 μmoles at 80–120 mesh of primary amine per gram of material, with lessened activity/gram being present with increasing average pore size from 75 Å to 700 Å.

A preferred silica gel solid matrix can be prepared from the aminopropyl silica gel available from Sigma Chemical Co. that has about 1–2 mmoles of primary amine per gram of material. This material thus has about 5- to 10-times the loading capacity of the controlled pore glass product. This material has a size of about 200–425 mesh and an average pore size of about 150 Å.

Silica gel HPLC supports are also available from Sigma Chemical Co. having average pore diameters of about 60–80 Å and surface areas of about 420 to about 500 mm$^2$/g. These particles are available in average particle diameters of about 5, 10, 30 and 60 microns. These silica-based particles can be converted into separation particles as discussed below.

Silica-based solid supports such as those discussed above are prepared from a suitable silica support such as silica gel or controlled pore glass by the reaction of an organosilicon compound with the support to covalently link an aminoalkylene group to the silica. These reactions are well known in the art. Amino-functional silanes having two or three $C_1$-$C_3$ alkoxy groups are particularly preferred organosilicon compounds for use in such linking reactions. Silanes having a mercapto functional group and those having an acetoxy group convertible to a hydroxyl group by aminolysis after covalent linking to the silicon-based matrix are also available and can be used.

Preferred amino-functional silanes are ω-amino-$C_2$-$C_6$-alkylenetri-$C_1$-$C_3$-alkoxy silanes. Exemplary compounds include 4-aminobutyltriethoxysilane and 3-aminopropyltrimethoxysilane. Other exemplary organosilanes from which a silicasbased support particle can be prepared include N-(2-aminoethyl)-3-aminopropylmethyldimethoxysilane, (aminoethylaminomethyl)phenethyltrimethoxysilane and N-(6-aminohexyl)aminopropyltrimethoxysilane. These materials are available from Hüls America, Inc., Piscataway, N.J., and their syntheses and use are discussed in Silicon Compounds: Register and Review, 5th ed., Anderson et al., eds., Hüls America, Inc., Piscataway, N.J. (1991) and in the citations therein.

A glycidylsilane such as 3-glycidoxypropyltrimethoxysilane, (3-glycidoxypropyl)diethoxysilane or the like can also be reacted with a silica-based solid support followed by reaction with a desired PEG compound such as PEG-2000 methyl ether to form desired separation particles. Hydroxyl- and mercapto-functional alkoxysilanes such as bis(2-hydroxyethyl)-3-aminopropyltriethoxysilane and 3-mercaptopropylmethyldimethoxysilane can also be reacted with a silica-based solid support followed by chain extension with ethylene oxide to provide useful separation particles.

Cross-linked dextran- and agarose-based particles are well known in the separation arts and are commercially available from Sigma Chemical Co. under trademarks SEPHADEX, SEPHACRYL, SEPHAROSE and PDX.

Each of the above materials is based upon polymerized glucose molecules that can be polyethoxylated with ethylene oxide to provide desired separation particles. Alternatively, a desired PEG compound can be first reacted with epichlorohydrin and the reaction product reacted with the glucose-based particles to form desired separation particles. In addition, cyanogen bromide activation can be used to add preformed PEG compounds such as the before-discussed PEG methyl ethers. See, for example Mathis et al., *J. Chromatogr.*, 538:456–461 (1991) and the citations therein.

Polyurethane/urea chemistry can also be utilized to prepare a desired separation particle. Here, a long chain PEG such as PEG-2000 or PEG-5000 is reacted with a di-isocyanate alone, or admixed with a polyamine or polyol to form a prepolymer. Exemplary di-isocyanates, polyamines and polyols include methylenebis(4-phenylisocyanate), toluene di-isocyanate, diethylenetriamine, triethylenetetramine, triethanolamine, N,N,N'-tri(hydroxyethyl)ethylenediamine, N,N,N',N'-tetra(hydroxyethyl)ethylenediamine, and the like. That prepolymer is then reacted with $C_2$-$C_6$ aliphatic diols or diamines to form polyurethanes and polyurea-urethanes, respectively. Exemplary diols and diamines include ethylene glycol and ethylene diamine, 1,4-butanediol and 1,4-butanediamine, as well as 1,6-hexanediol and 1,6-hexanediamine. A $C_1$-$C_{10}$ hydrocarbyl PEG 750–5000 ether as discussed herein can also be added at this stage as an end capping reagent as is well known. Exemplary materials are discussed in Fong et al., *Talanta*, 39:825 (1992) and Jones et al., *Anal. Chim. Acta*, 182:61 (1986).

A PEG compound, as is defined above by the formula X—$(CH_2CH_2O)_n$—$CH_2CH_2R$ and discussed in detail hereinafter, is present on the surface of the separation particles either intrinsically as a result of the copolymerization process that formed the particle or extrinsically from a grafting reaction carried out after the particle is formed. Although not wishing to be bound by theory, the data in hand tend to indicate that although the various solid support particles have pores, the separations contemplated here appear to operate from the outside surfaces of the particles and away from the pores. As a consequence, particles having smaller particle diameters, e.g. 200–400 mesh (75–38 microns) and smaller (5–10 microns), are favored over particles having larger diameters, e.g. 80–120 mesh (180–115 micron), because of the greater surface area per gram provided by the smaller particles. In addition, porous materials having smaller pore sizes are preferred.

The PEG compound present on the separation particles can itself be quite varied in composition, but contains at least one poly(oxyethylene) chain [(—$CH_2CH_2O$—)$_n$] having an average molecular weight of about 700 to about 10,000, with a molecular weight of about 2,000 to about 5,000 being more preferred. More specifically, the PEG compound group of the separation particle corresponds to the formula —X—$(CH_2CH_2O)_n$—$CH_2CH_2R$ where X, n and R are defined and discussed hereinbelow.

In the above formula, n is a number having an average value of about 15 to about 225, and more preferably about 40 to about 130. It is well known that the higher molecular weight PEG compounds are usually mixtures rather than pure compounds having a single molecular weight. As a result, n, the number of ethyleneoxy repeating units, is a number that is an average number.

The terminal R group is selected from the group consisting of —OH, $C_1$-$C_{10}$ hydrocarbyl ether (alkoxy group) having a molecular weight of up to about one-tenth of the —$(CH_2CH_2O)_n$— portion, carboxylate, sulfonate, phosphonate and —$NR^1R^2$ groups, where each of $R^1$ and $R^2$ is independently hydrogen, $C_1$-$C_6$ alkyl or $C_2$-$C_3$ hydroxyalkyl or —$NR^1R^2$ together form a 5- or 6-membered cyclic amine having zero or one oxygen atom or zero or one additional nitrogen atom in the ring.

Exemplary $C_1$-$C_{10}$ hydrocarbyl ether groups are well known and include alkyl, alkenyl, alkynyl and aromatic ethers. Illustrative $C_1$-$C_{10}$ ethers thus include methyl, which is most preferred, ethyl, isopropyl, n-butyl, cyclopentyl, octyl, decyl, 2-cyclohexenyl, 3-propenyl, phenyl, 1-naphthyl, 2-naphthyl, benzyl, phenethyl and the like ethers. These ether groups can also be named methoxy, ethoxy, isopropoxy, n-butoxy, cyclopentyloxy, octyloxy, decyloxy, 2-cyclohexenyloxy, 3-propenyloxy, phenoxy, 1-naphthoxy, 2-naphthoxy, enzyloxy and phenethyloxy. A $C_1$-$C_6$ hydrocarbyl group is a particularly preferred R group.

The molecular weight of a $C_1$-$C_{10}$ hydrocarbyl ether can be up to about one-tenth of the weight of the —$(CH_2CH_2O)_n$— portion of the PEG group. Thus, where n is 20, the —$(CH_2CH_2O)_n$— portion has a molecular weight of 880 (20×44) so that the molecular weight of R can be up to about 90, or about the weight of a phenoxy group. It is more preferred that the molecular weight of the $C_1$-$C_{10}$ hydrocarbyl group be about 0.2 to about 2 percent of the molecular weight of the —$(CH_2CH_2O)_n$— portion.

The $R^1$ and $R^2$ portion of an —$NR^1R^2$ R group can individually and independently be hydrogen, $C_1$–$C_6$ alkyl or $C_2$–$C_3$ hydroxyalkyl so that R can be a primary amine (—$NH_2$), a secondary amine (—$NHR^2$ or —$NHR^2$) or a tertiary amine. The non-hydrogen $R^1$ and $R^2$ groups that are $C_1$–$C_6$ alkyl are as discussed before, e.g. methyl, ethyl, isopropyl, sec-butyl, cyclopentyl and hexyl, whereas a $C_2$–$C_3$ hydroxyalkyl group is a 2-hydroxyethyl, 2-hydroxypropyl or 3-hydroxypropyl group.

The nitrogen atom and the $R^1$ and $R^2$ portions of an —$NR^1R^2$ group can, together with the depicted nitrogen atom, form a cyclic amine group whose ring contains 5- or 6-members. That 5- or 6-membered ring amine group can contain only carbon atoms in addition to the depicted nitrogen, carbons plus one oxygen or carbons plus one nitrogen atom in addition to that depicted in —$NR^1R^2$. Exemplary cyclic amine groups include piperidinyl, pyrrolidinyl, imidazolyl, piperazinyl and morpholinyl groups.

In the above formula, X can be O, S, NH or N—$(CH_2CH_2O)_m$—$R^3$. Use of an X group that is O, S or NH should be straightforward for the worker of ordinary skill. X is most preferably O, so that the separation particles most preferably have a plurality of covalently bonded surface —O—$(CH_2CH_2O)_n$—$CH_2CH_2R$ groups.

Where X is N—$(CH_2CH_2O)_m$—$R^3$, two PEG groups can be present that are the same or different. Thus, the —$(CH_2CH_2O)_n$—$CH_2CH_2R$ portion of the —X—$(CH_2CH_2O)_n$—$CH_2CH_2R$ group is always present, and as such, a PEG compound containing about 15 to about 225 —$(CH_2CH_2O)$— repeating groups is always linked to the surface of a separation particle. Where X is N—$(CH_2CH_2O)_m$—$R^3$, m is zero and $R^3$ is hydrogen, X reduces to —NH. However, m can also be about 15 to about 225, and more preferably about 40 to about 130, as can n, as $R^3$ can be $CH_2CH_2R$ so that the nitrogen atom of an N—$(CH_2CH_2O)_m$—$R^3$ group can be substituted by two identical PEG groups.

Where R is —OH, that terminal hydroxyl can be the result of the use of poly(ethylene glycol) itself or of an ethoxylation reaction with ethylene oxide. A $C_1$–$C_{10}$ hydrocarbyl ether R group can be preformed as where a PEG-methyl ether is used as is exemplified herein, or that ether group can be formed by an endcapping reaction of particles having a hydroxyl R group with a strong non-nucleophilic base such as sodium hydride and a hydrocarbyl compound having a suitable leaving group such as a halide (e.g. chloro or bromo) or a sulfate ester such as a trifate, mesylate or tosylate group.

Similar end-capping reactions can also be used to add the carboxylate, sulfonate, phosphonate and —$NR^1R^2$ R groups. Exemplary compounds useful here include 2-chloroacetic acid, 4-(2-chloroethyl)piperidine and 1-(2-chloroethyl)pyrrolidine. N-(2-chloroethyl)succinimide or phthalimide can be similarly added to a terminal R hydroxy group followed by reaction with hydrazine to remove the phthalimide group and subsequent reaction with a $C_1$–$C_6$ alkyl group having a before-described leaving group. Where only a single $C_1$–$C_6$ alkyl group is desired, the free primary amine provided after reaction with hydrazine can be blocked with a removable blocking group such as t-butoxycarboryl (BOC) group prior to alkylation followed by removal of the BOC group to provide a desired secondary amine. A desired $R^3$ group can be similarly prepared.

It is also to be noted that although it is generally easier to prepare desired separation particles from a single PEG compound, even though that compound may itself be a mixture, one can also prepare useful separation particles using PEG compounds of quite different chain lengths. The values of n for separation particles containing PEG compounds of very different chain lengths nonetheless are about 15 to 225.

For example, separation particles referred to herein as ABEC-5.75K were prepared by first reacting Merrifield's peptide resin particles with PEG-5000 methyl ether to form ABEC-5K separation particles. Those separation particles were then reacted with PEG-750 methyl ether to form ABEC-5.75K separation particles.

The amount of a PEG compound present on the surface of a separation particle is provided by the percent $CH_2O/mm^2$ of particle surface area value. That value is typically greater than about 8,000 and less than about 1,000,000, and is preferably greater than about 9,000 and less than about 20,000, particularly for the particularly preferred separation particles prepared from 200–400 mesh Merrifield's peptide resin particles. Larger values are provided where still smaller particles such as the 5 micron average diameter silica gel particles are used.

The percent $CH_2O/mm^2$ of particle surface area ($CH_2O/mm^2$) value is readily calculated using $^{13}C$ NMR integrals and the average particle surface area in $mm^2$. $^{13}C$ Resonances for carbon atoms adjacent to an etherial oxygen differ from those for carbon atoms adjacent to other carbons or other elements.

Thus, using the particularly preferred Merrifield's peptide resin-based separation particles as illustrative, one can determine the solid $^{13}C$ NMR spectrum and determine a ratio of the number of $CH_2O$ carbons to those provided by the initial resin. Multiplication of that ratio by 100 percent and division by the average particle surface area provides the $CH_2O/mm^2$ value. The exemplary $CH_2O/mm^2$ values utilized hereinafter are based upon the surface area of 400 mesh particles. Similar solid phase $^{13}C$ NMR determinations can be carried out using separation particles prepared using the other before-discussed particles.

As noted previously, the separation particles are hydrophilic; i.e., wettable. Wettability of useful separation particles can be quantitatively approximated by calculation of a dry weight conversion factor (WCF) value for the particles. This value is approximate because for those separation particles that are only slightly wettable, the calculations involve small differences between large numbers, and even slight separation particle losses during manipulations can have a major impact upon the calculated WCF value. Nonetheless, WCF values can be useful in further defining useful separation particles.

The WCF value for the separation particles is calculated by dividing the weight of dried separation particles by the weight of those particles after suspension in a specified aqueous medium under specified conditions followed by recovery and air-drying of those particles. These procedures are detailed hereinafter.

Useful separation particles typically exhibit WCF values of about 0.9 to about 0.01, with the particularly preferred separation particles exhibiting WCF values of about 0.1 to about 0.6. The particularly preferred ABEC-2K and ABEC-5K separation particles discussed hereinafter exhibited WCF values of about 0.32 and 0.37, respectively, indicating about 68 and 63 percents hydration, respectively, after air-drying. The useful, but less preferred ABEC-0.75K separation particles exhibited a WCF value of 1, indicating little, if any, post-drying hydration.

A component of the aqueous solution used in a contemplated process is a poly(ethylene glycol) liquid/liquid biphase-forming amount of a dissolved salt or lyotrope that is discussed hereinafter. It is well known that particular dissolved salts at particular concentrations and temperatures cause aqueous solutions of relatively high molecular weight poly(ethylene glycols) to form a liquid/liquid biphase; i.e., two distinct immiscible layers within the composition, in which one layer is relatively rich in PEG and the other is relatively rich in salt. This phenomenon is often referred to as salting out the PEG.

The liquid/liquid biphase formation is caused by the presence of water-soluble salts whose anion is principally responsible for forming the biphasic system. The ammonium and alkali metal ions are usually the cations of choice with a given lyotropic anion because of their relatively high solubilities in aqueous solution, particularly as compared to multivalent cations. $MoO_4^{2-}$ salts or other salts that can form do not precipitate. Precipitation with other cations can be minimized by pH value adjustment as is well known for individual salts.

Keeping the molecular weight and concentration of the PEG constant, aqueous liquid/liquid biphase formation is generally favored by increasing salt concentration to the point of saturation, and increasing temperature between about 20° and about 60° C. At a constant concentration of a salt and temperature, aqueous liquid/liquid biphase formation is favored by increasing PEG molecular weight, although aqueous liquid/liquid biphase formation is not observed with a PEG having a molecular weight of about 750 or lower.

The presence of an aqueous liquid/liquid biphase can be observed usually by an interface that forms between the two immiscible layers and/or by turbidity of the composition on mixing. The formulation of an analogous layering is presumed to occur in the aqueous environment surrounding the separation particles, but physical evidence for the existence of such formation has not yet been observed.

An indirect assay for the amount of an appropriate salt present in the aqueous solution is therefore used herein. That indirect assay is based on the observations (i) that salt concentrations that form aqueous poly(ethylene glycol) liquid/liquid biphases in solution are useful in a present process, and (ii) PEG-750 that does not form such a biphase when free in solution in the presence of a biphase-forming amount of salt can be used when present covalently linked to the surface of separation particles as the sole PEG compound present in the presence of that amount of salt.

Thus, an aqueous poly(ethylene glycol) liquid/liquid biphase-forming amount of a dissolved salt that is present in an aqueous solution used to contact the separation particles is an amount of a salt that causes a solution of PEG-2000 to form a biphase at a PEG-2000 concentration of about 4 to about 50 weight percent and at a temperature of 25° C. Several such salts and their concentrations are provided in Ananthapadmanabhan et al., *Langmuir*, 3:24–31 (1987). In addition, one can carry out a simple study by preparing a solution of 4 to about 50 weight percent PEG-2000 containing a desired concentration of a salt and determine whether biphase formation occurs at 25° C.

A lyotropic salt or lyotrope structures liquid water. The effects of lyotropes and destructuring salts, chaotropes, were noted by Hofmeister in 1888 as a function of protein solubility, and that solubility was found to be mostly a function of the anion portion of the salt. A "series" of anions and cations was developed based on protein solubilities in solutions containing those ions. Gagnon et al., *BioPharm*, 9:54 (1996) provide a Hofmeister series of lyotropic and chaotropic ions. See, also Collins et al., *Quart. Rev. Biophysics*, 18(4):323–422 (1985).

Biphase-formation is thus believed to be a function of the water-structure-making or lyotropic property of the salt used. See, P. Becher, *Dictionary of Colloid and Surface Science*, Marcel Dekker, Inc., New York, 1990 pages 95–96; Voet, *Chem. Rev.*, 20:169–179 (1937). The greater is the water-structure-making property, the more readily an aqueous poly(ethylene glycol) liquid/liquid biphase is formed. Those materials that exhibit water-structure-breaking or chaotropic properties are retained on the separation particles.

As noted by Collins et al., *Quart. Rev. Biophysics*, 18(4): 323–422 (1985), several physical measurements such as heats of hydration and entropy changes on hydration of ions have been used to characterize water structure-making and water structure-breaking characteristics of ions. More particular entropy changes on the structure of water ($\Delta S_{istr}$) are provided in Table 5.13 in Y. Marcus, *Ion Solvation*, John Wiley & Sons, Ltd., New York (1985) 124–127. Ions that exhibit negative $\Delta S_{istr}$ values generally enhance the structure of water and are lyotropes, whereas those with positive values generally destructure water and are chaotropes. The iodate anion, $IO_3^{1-}$, appears to be an exception to this generality and behaves as a chaotropic anion even though it has a negative value, although $IO_3^{1-}$ may behave more lyotropically in the presence of a more chaotropic salt inasmuch as $\Delta S_{istr}$ values are relative.

Another useful numerical definition for a chaotropic anion is provided by the $B_i$ value of Gurney, *Ionic Processes in Solution*, McGraw-Hill, New York (1953) that are also noted in Table 5.13 of the Marcus text. This value is a function of viscosity, with those ions that enhance viscosity being water structure makers (lyotropes) and those that lower viscosity being water structure breakers (chaotropes). Here, values of $B_i$ that are negative denote chaotropic ions, whereas those ions having positive values are lyotropic water structure makers.

Exemplary lyotropic anions useful in providing an aqueous poly(ethylene glycol) liquid/liquid biphase form water-soluble salts with ammonium or alkali metal cations, and are provided in Table 1, below.

TABLE 1

| Anion | Anion |
|---|---|
| Hydroxide | Chromate |
| Fluoride | Molybdate |
| Carbonate | Tungstate |
| Silicate | Orthovanadate |
| Sulfate | Thiocyanate |
| Phosphate | Thiosulfate |
| Dihydrogen phosphate | Fluorosilicate |
| Hydrogen phosphate | Orthosilicate |
| Formate | Hydroxyethane-1,1-diphosphonate* |
| Acetate | |
| Succinate | Vinylidene-1,1-diphosphonate* |
| Tartrate | |
| Citrate | Chloride |

*The -2, -3 and -4 anion forms; i.e., the protonated forms, are useful.

It is also to be noted that the chloride anion is generally a poor lyotropic anion. Sodium and ammonium chlorides do not cause biphase formation with PEG-2000 at 25° C.

The chloride anion has a $\Delta S_{istr}$ value of +12 and a $B_i$ value of −0.005 according to Table 5.13 of Y. Marcus, *Ion Solvation*, John Wiley & Sons, Ltd., New York (1985), 124–127. That Table reports that the sodium cation has a $\Delta S_{istr}$ value of −16 and a $B_i$ value of +0.085, whereas the ammonium ion has values of +5 and −0.008, respectively, according to that text.

These values notwithstanding, ammonium chloride, when used from about 3 molar to saturation, about 30 grams/100 mL at zero degrees C. (about 5.6 molar at zero degrees C.) is a useful lyotrope in a contemplated process. Sodium chloride, when similarly used at about 3 molar to saturation, about 36 grams/100 mL at zero degrees C. (about 6.2 molar at zero degrees C.) is also useful herein. The lyotropic character of sodium chloride is illustrated in the cloud point data for high molecular weight poly(ethylene oxide) (PEO) reported in Ananthapadmanabhan et al., *Langmuir*, 3:25–31 (1987); cloud point and phase separation being stated to be the same phenomenon by those authors.

A further way to characterize an aqueous poly(ethylene glycol) liquid/liquid biphase-forming amount of a dissolved salt is that the concentration is about 0.05 molar to saturation, and the calculated Gibbs free energy of hydration ($\Delta_{hyd}G$) of the anion is less than about −300 kJ/mole. Exemplary calculated $\Delta_{hyd}G$ values can be found in Marcus, *J. Chem. Soc., Faraday Trans.*, 87:2995 (1991).

It is also to be noted that once an appropriate amount of an aqueous poly(ethylene glycol) liquid/liquid biphase-forming soluble salt (lyotrope) is present, other anions and cations can also be present, and mixtures of different biphase-forming salts can be used to provide a biphase-forming amount. Thus, non-biphase-forming anions such as nitrate can be present in the aqueous solution, and mixtures of biphase-forming anions such as hydroxide and carbonate can be used as the biphase-forming soluble salt.

Particularly preferred water-soluble lyotropic salts have an ammonium or alkali metal cation and an anion that is carbonate, sulfate, phosphate (each anion or mixtures of hydrogen phosphate anions) or chloride. Ammonium sulfate and ammonium chloride are most preferred.

The pH value of the above-discussed aqueous solution is between 0 and 14. Thus, for example, non-biphase-forming nitrate anions, as well as biphase-forming sulfate and phosphate anions can be present as their respective acids. At a pH value of 12, achievable by use of 0.01 molar hydroxide ion, the concentration of hydroxide ion if used alone is too low to form a desired biphase, so other anions such as carbonate, phosphate or sulfate are also utilized to provide an appropriate salt concentration.

The pH value of the aqueous solution containing the anionic dye and poly(ethylene glycol) liquid/liquid biphase-forming amount of lyotropic salt and from which the dye is concentrated and ultimately recovered is equal to, and preferably one pH unit greater than, the highest $pK_a$ value of the anionic dye to be concentrated and recovered. Thus, if an anionic dye having a carboxyl group having a $pK_a$ of 3.5 in the extraction solution salts is used, the aqueous solution used has a pH value 3.5, and preferably of 4.5 or greater. Where an ammonium ion-forming functionality and an anion-forming functionality are both present in the dye molecule to be concentrated, as is the case for Ethyl Orange, a pH value equal to the $pK_a$ value of the amine/ammonium ion group is utilized as the amine/ammonium ion $pK_a$ value is typically higher than that of the anion-forming group.

The equality of pH and $pK_a$ assures that at least one-half of the anion-forming functional groups are ionized. The preferred one unit difference between pH value and dye $pK_a$ value assures that at least 90 percent of the acid groups are ionized and that the molecule is anionic in the contacting solution. More preferably, the difference between the $pK_a$ of the most acidic anion-forming substituent group and the pH value of the aqueous solution is two units or more.

Where the $pK_a$ value of the most acidic anion-forming substituent is not known, as where the identity of the anion-forming group is unknown, a simple electrophoretic study at several different pH values can be readily carried out to determine a pH value at which the dye has a charge of at least minus one, as is well known. Dyes containing sulfonate functionalities are preferred, and those substituents typically exhibit $pK_a$ values of less than 2 so that the $pK_a$ value of the anionic substituent is readily exceeded by most dye-containing solutions without a further pH value adjustment. A simple pH value adjustment can also be made if needed by an addition of sodium hydroxide or other suitable base.

A dye whose concentration and recovery is contemplated by a process of this invention is an anionic dye; i.e., a dye having one or more acid substituent functionalities or the salts of such functional groups. Upon dissolution of an acid dye, the dye ionizes with the dye structure being present in the negatively-charged, anionic, portion of the solvated molecule, as compared to the plus-charged portion.

An anionic dye can have one or more of several anion-forming substituent functional groups. Most usually, and preferably, at least one sulfonic acid or sulfonate functional group is present. Carboxyl and carboxylate, arsenic acid and arsenate, and phosphonic acid and phosphonate anion functionalities can also be present.

A contemplated anionic dye exhibits a water-solubility of about 1 to about 200 milligrams per milliliter of water (mg/mL) as noted in F. J. Green, *The Sigma-Aldrich Handbook of Stains, Dyes and Indicators*, Aldrich Chemical Co., Inc., Milwaukee, Wis. (1991). Uncharged, neutral, dyes such as Indigo typically exhibit lower water-solubilities. Cationic dyes often exhibit water-solubilities similar to those of anionic dyes, although solubilities of the dyes examined to date have been less than about 100 mg/mL.

Neutral and cationic dyes typically are bound poorly by the contemplated separation particles, and/or strip poorly upon contact of the dye-bound particles with an aqueous solution that does not contain a poly(ethylene glycol) liquid/liquid biphase-forming amount of a dissolved lyotropic salt. This difference in behavior between anionic dyes and neutral or cationic dyes in a contemplated process is to be contrasted with the similar partitioning properties exhibited by the same three dye types observed in liquid/liquid biphase partition studies reported by Rogers et al. in "Value Adding Through Solvent Extraction", *Proceedings of ISEC '96*, Shellcross et al. eds., The University of Melbourne, Parkville, Victoria, Australia, Vol. 2:1537–1542(1996).

The dyes discussed herein can have many names, including proper chemical names as well as tradenames and generic names, much like drugs. The names used herein are typically the generic name used by the *Color Index*, The Society of Dyers and Colourists, Bradford, England, Third Edition, Fourth Revision (1992). The *Color Index* (C.I.) number and tradename are also often used.

A contemplated dye contains one, and preferably at least two, aromatic rings that contain 5- or 6-members in each ring. An exemplary ring can be an isolated aromatic ring such as a phenyl or a pyrazolone ring, or can be part of a fused ring system as is present in an indigoid ring system, anthraquinone ring system, naphthalene ring system or the like.

The aromatic rings can be completely carbonaceous, or can contain nitrogen, oxygen or sulfur atoms. Exemplary heteroatom-containing anionic dyes include the nitrogen-containing substituted triazines such as Reactive Blue 4 (C.I. 61205) or indigoid rings as in Indigo Carmine (C.I. 73015, Acid Blue 74). An exemplary sulfur-containing ring system can be found in Primuline (C.I. 49000, Direct Yellow 59), whereas an oxygen-containing ring system can be exemplified by Fluorescein (C.I. 45350, Acid Yellow 73).

As has already been noted, a dye utilized in a contemplated process is an anionic or acid dye. Thus, the dye is at least 50 percent ionized at the pH value utilized in the process. The preferred anionic functional group is the sulfonate ($-SO_3^{1-}$) group, and at least one such group is present in preferred practice, with the presence of two or more such groups being more preferred. Other functional groups, as anions that can also be present along with or in place of a preferred sulfonate group include carboxylate ($-CO_2^{1-}$), phosphonate ($-PO_3H^{1-}$), arsenate ($-AsO_3H^{1-}$) and the hydroxide group of a phenoxide ($-O^{1-}$).

A preferred anionic dye absorbs light in the visible spectrum and therefore exhibits a color. A contemplated dye need not, however, exhibit a color and can instead fluoresce, phosphoresce or simply absorb ultraviolet light with a $\lambda_{max}$ at about 290 nm to the visible; i.e., about 400 nm. Salicylic acid is exemplary of the latter dye materials.

Table 2, below, lists several useful dyes and their anionic functional groups.

TABLE 2

| Dye (C.I.)* | Anionic Functionality |
|---|---|
| Direct Blue 1 (24410) | $-SO_3^{1-}$ |
| Direct blue 71 (34140) | $-SO_3^{1-}$ |
| Direct Orange 31 (23655) | $-SO_3^{1-}$ $-CO_2^{1-}$ |
| Direct Red 80 (35780) | $-SO_3^{1-}$ |
| Direct Yellow 59 (49000) | $-SO_3^{1-}$ |
| Reactive Red 4 (18105) | $-SO_3^{1-}$ |
| Acid Alizarin Violet N (Mordant Violet 5; 15670) | $-SO_3^{1-}$ |
| Indigo Carmine (Acid Blue 74; 73015) | $-SO_3^{1-}$ |
| Naphthol Green B (Acid Green; 10020) | $-SO_3^{1-}$ |
| Phloxine B (Acid Red 92; 45410) | $-CO_2^{1-}$ $-O^{1-}$ |
| Reactive Blue 19 (61200) | $-SO_3^{1-}$ |
| Reactive Blue 4 (61205) | $-SO_3^{1-}$ |
| Acid Yellow 1 (10316) | $-SO_3^{1-}$ |
| Gallocyanine (Mordant Blue 10; 51030) | $-CO_2^{1-}$ $-O^{1-}$ |
| Direct Red 75 (25380) | $-SO_3^{1-}$ |
| Alizarin Complexone | $-CO_2^{1-}$ $-O^{1-}$ |
| Acid Orange 10 (16230) | $-SO_3^{1-}$ |
| Ethyl Orange | $-SO_3^{1-}$ |

*Color Index number; after generic name

Continuing with the process steps, the before-described separation particles are contacted with the before-described anionic dye-containing aqueous solution. This contacting is an admixing manipulation and can occur in any vessel, and constitutes what can also be termed a loading phase of the process. Thus, one can simply admix the separation particles and an aqueous solution in a laboratory vessel such as a beaker or flask. More preferably, the contacting is carried out in a chromatography column of an appropriate size for the contemplated separation.

Chromatography columns are well known in the art and are generally cylindrical, have an inlet means for adding an eluting solvent at or near one end, an outlet means for egress of solvent at or near the other end, and a means for maintaining the separation particles between the inlet means and outlet means. Such columns are made of a material that is inert to the materials that are therewithin; i.e., glass, plastic such as polypropylene, or stainless steel, and can be designed to operate in any position; i.e., vertically, horizontally, or in a coil. Exemplary separations using small chromatography columns are illustrated hereinafter.

The admixing of separation particles and anionic dye-containing aqueous salt solution can take place with the separation particles being dry or wet with water or another aqueous solution prior to contact. It is preferred, however, that the separation particles be hydrated in an aqueous solution of a poly(ethylene glycol) liquid/liquid biphase-forming salt prior to that contacting (admixing). More preferably, that salt solution contains the same salt at about the concentration to be used for carrying out the process.

Where the contacting step is carried out in a laboratory vessel, the separation particles can be premixed with an appropriate aqueous salt solution, typically with some agitation, for a time period sufficient for dry separation particles to hydrate (swell). The separation particles are then recovered as by decantation of the liquid or by filtration, and are then admixed with the aqueous solution containing the dye. Where the separation particles are within a chromatography column, a few free column volumes (fcv) of an appropriate aqueous salt-containing solution are preferably passed through the column prior to the contacting step. Regardless of the technique used, appropriate hydration typically requires only a few minutes.

The contacting forms a solid/liquid phase admixture. The contact is maintained for a time period sufficient for the anionic dye (chaotrope) to bind to the solid phase separation particles and form a liquid phase aqueous solution that has a reduced concentration of anionic dye molecules. Typically, the aqueous solution is substantially free of anionic dye; i.e., no dye can be seen in the eluate. It is noted, however, that once the capacity of the separation particles has been exceeded and the separation particles are loaded, some anionic dye molecules "break through" and color the eluate, as can colored impurities, at which time loading of the column is terminated.

The solid phase anionic dye-bound separation particles are preferably separated from the liquid phase formed during the maintenance step. This separation is carried out while maintaining the anionic dye-bound separation particles in the presence of an aqueous solution of a poly(ethylene glycol) liquid/liquid biphase-forming amount of a salt.

In a process utilizing a chromatographic column, the degree of this separation can be enhanced by washing the column with an aqueous solution of the same or a different poly(ethylene glycol) biphase-forming lyotropic salt used during the separation step or washing with a solution of another such salt. This wash or rinse step is carried out so that impurities that may remain in the interstitial volume of the column are removed prior to stripping of the chaotropic dye anion so that a higher purity product can be obtained. For example, where the column is loaded using an aqueous solution of 1.5M $(NH_4)_2SO_4$ as the biphase-forming salt solution, the column can be washed with more of that salt or one can use an aqueous solution containing 3M $(NH_4)_2SO_4$ or $(NH_4)_2CO_3$. Such a wash step (separation) is preferred, but not required.

Where a laboratory or other vessel such as a flask or beaker is used for the process, the aqueous liquid phase formed after the maintenance step can be decanted off or separated by filtration or the like. That physical separation is preferably followed by one or more washes with aqueous salt solution as discussed above.

Regardless of the procedure used, when a preferred separation is carried out, a second solid/liquid phase admixture is formed. That second solid/liquid phase admixture contains anionic dye-bound separation particles (solid phase) that are in the presence of an aqueous solution of a poly(ethylene glycol) liquid/liquid biphase-forming amount of a dissolved lyotropic salt.

The anionic dye molecules are freed from their bound state by contacting (admixing) the anionic dye-bound separation particles with a second aqueous solution that does not contain a poly(ethylene glycol) liquid/liquid biphase-forming amount of a dissolved lyotropic salt to free the anionic dye molecules from the separation particles and form an aqueous solution containing free anionic dye molecules along with their corresponding cations. Thus, a third solid/liquid phase admixture is formed where solid phase constitutes the hydrated separation particles.

Distilled or deionized water is a convenient second aqueous solution for this purpose. This stripping solution can also contain up to 100 volume percent of a water-miscible organic solvent. Exemplary B water-miscible organic solvents include methanol, ethanol, isopropyl alcohol, dimethyl sulfoxide, acetone, ethylene glycol, propylene glycol, acetonitrile and the like. The second aqueous solution also can contain biphase-forming salts such as potassium carbonate and potassium phosphate, but the concentration of those salts is less than an aqueous poly(ethylene glycol) liquid/liquid biphase-forming amount. This second aqueous solution is sometimes referred to herein as a stripping solution because of its use to strip the anionic dye from the separation particles.

The pH value of a stripping solution can be from about zero to about 14, but is more preferably about 6 to about 8.

The aqueous solution containing free anionic dye molecules is then recovered. The recovered aqueous solution containing anionic dye molecules contains the dye at a concentration greater than that of the original aqueous solution that was contacted with the separation particles, when the initial dye-containing solution has a dilute concentration of dye as is discussed below.

The concentration difference between the original anionic dye-containing solution can depend upon a number of factors. Among those factors, the original anionic dye concentration is one of the more important, as is the absence of lyotropic salts in the strip solution.

As can be seen from FIGS. 1-5, concentrations of about 10- to about 1000-fold can be achieved between the original and recovered aqueous anionic dye solutions using initial dye concentrations in the $10^{-3}$ to $10^{-6}$ molar range, or less. These concentration enhancements permit unused dyes to be recovered for reuse, or permit used dyes to be disposed of more efficiently, as in the case of reactive dyes whose reactive functionality has hydrolyzed.

In a chromatographic environment, one can simply wash the column containing the separation particle-bound anionic dye molecules with the desired second aqueous solution, and then collect the eluate. As is seen from FIGS. 1-5, elution of the previously bound anionic dyes can be quite sharp. Where the separation is carried out in a laboratory or other vessel, one can simply wash (contact and mix) the appropriate separated solid phase with the second aqueous solution and then collect the resulting liquid phase as by filtration or decantation.

A before-described process is typically carried out at ambient room temperature. However, such a process can also be carried out at any temperature above the freezing point and below the boiling point of the aqueous solutions utilized. A contemplated process is typically carried out at ambient atmospheric pressure, but can also be carried out at an elevated pressure.

Results

Characterization Of Separation Particles For Binding Inorganic Chaotropic Anions Reaction of the sodium alkoxide of poly(ethylene glycol) 2000 methyl ether) (Me-PEG-2000) with a chloromethylated polystyrene (with 1 percent divinylbenzene cross-linking; Aldrich Chemical Co.), also referred to as Merrifield's peptide resin, afforded a dirty white material. The reacted Merrifield's peptide resin [cross-linked poly(styrene-co-vinyl benzyl chloride)] was no longer a free flowing solid like the precursor beads, however, the new material maintained a resin-like consistency. When contacted with water the material was evenly dispersed and readily hydrated. Gravimetric analysis revealed a dry weight conversion factor of 0.316 (or 68.4 percent water) for the Me-PEG-200 modified material, indicating extensive wettability and a high potential for aqueous biphasic behavior. Uptake studies for pertechnetate from a variety of biphase-forming salt solutions showed high weight distribution ratios and will be discussed below.

Four other polystyrene-based chromatographic materials were prepared with the monomethyl ether derivatives of PEG-350, PEG-750, PEG-5000, and PEG-5000+PEG-750, with most of the work being done with monomethyl ethers of PEG-350, -750, -2000 and -5000. These materials were synthesized to investigate the influence of PEG molecular weight on metal ion partitioning and aqueous biphasic behavior. These resins were prepared in a manner identical to that for Me-PEG-2000, and all afforded dirty white bead-like solids. Separation particles prepared using Me-PEGs having molecular weights of 350, 750, 2000, 5000 and both 5000 and 750 are named separation particles, ABEC-0.35K, ABEC-0.75K, ABEC-2K, ABEC-5K, and ABEC-5.75K respectively.

A number of metal cations including $Na^{1+}$, $Cs^{1+}$, $Ca^{2+}$, $Sr^{2+}$, $Mn^{2+}$, $Co^{2+}$, $Cd^{2+}$ and $Tl^{1+}$ were assayed for retention by ABEC-2K separation particles from both water and 5.05 molal (m) $(NH_4)_2SO_4$. None of the above metal cations was retained by the material, and this is in keeping with their behavior in liquid/liquid aqueous biphasic separations where none of those metal ions partitions to the PEG-rich phase. Because the pertechnetate anions partition to the PEG-rich phase in liquid/liquid aqueous biphasic systems without the aid of an extractant, [Rogers et al., *Solvent Extr. Ion Exch.*, 13:665–688 (1995); Rogers et al., In *Aqueous Biphasic Separation: Biomolecules to Metal Ions*; Rogers and Eiteman, eds; Plenum: New York, 1995, pages 1–20; Rogers et al., *Solvent Extr. Ion Exch.*, 13:689–713 (1995); Rogers et al., *Sep. Sci. Technol.*, 28:1091–1126 (1993)] that ion was used as a probe for biphasic character.

Weight distribution ratios for $TcO_4^{1-}$ have been determined from $(NH_4)_2SO_4$, $K_2CO_3$, $K_3PO_4$, and NaOH solutions as exemplary. These salts are known as liquid/liquid biphase forming anions and cover a broad range of chemical characteristics.

Weight distribution ratios for $TcO_4^{1-}$ anions onto unmodified chloromethylated polystyrene-1-percent-divinylbenzene from both water and 5.05 m $(NH_4)_2SO_4$ were near unity. Pertechnetate retention by ABEC-2K separation particles from water was extremely low affording a $D_w$ of only 8.7.

The amount of solute on the separation particles is determined by a difference method and therefore $D_w$ values less than one are difficult to obtain due to error inherent in the assay method. $D_w$ values less than 20 generally indicate little if any retention. A $D_w$ value of about 200 is maximally observed in a liquid/liquid extraction of $TcO_4^{1-}$ ions in NaOH using 20-70 weight percent aqueous PEG-2000.

A study of $D_w$ values for $TcO_4^{1-}$ anions with ABEC-0.35K particles was carried out at 25° C. using the before-mentioned four liquid/liquid biphase-forming salts. All of the weight distribution ratios were below ten and indicated no retention of pertechnetate by these potential separation particles. The dry weight conversion factor for this material was 1.0, meaning that it was not hydrated within the limits of this measurement. In fact, this material behaved very similarly to the unmodified chloromethylated polystyrene-1-percent-divinylbenzene. Both materials had extremely low wettabilities, were not evenly dispersed in water, and consequently showed no aqueous biphasic partitioning behavior.

Separation particles denominated ABEC-0.75K showed an appreciable increase in $TcO_4^{1-}$ anion distribution with a maximum $D_w$ of 460 at 4.08 m $(NH_4)_2SO_4$. Pertechnetate retention started low, maximized, and then tailed from $PO_4^{3-}$, $CO_3^{2-}$, and $SO_4^{2-}$ solutions. Sodium hydroxide afforded the lowest weight distribution ratios that sharply decreased from a maximum $D_w$ of 96 at 2.78 m NaOH.

Separation particles ABEC-0.75K, like ABEC-0.35K, had a dry weight conversion factor of 1.0. Although not as hydrophobic as ABEC-0.35K particles, this material dispersed evenly in water and is useful, but difficult to handle because it has a gummy consistency.

Separation particles ABEC-2K were the first material to show a behavior similar to aqueous biphasic partitioning. The potential of this material was suggested by its dry weight conversion factor, which indicated a 68.4 percent water content. Maximal $D_w$ values were 4500, 6200, 1900, and 880 from 5.05 m $(NH_4)_2SO_4$, 5.92 m $K_2CO_3$, 3.14 m $K_3PO_4$, and 4.41 m NaOH, respectively, were obtained using these particles. $D_w$'s from sodium hydroxide peaked at an intermediate salt concentration (4.41 m) and then began to decrease. The remaining salts all showed a reasonable increase in weight distribution ratios, with $K_2CO_3$ affording the highest $D_w$ values.

Weight distribution ratio profiles using ABEC-5K separation particles have the same general features as those observed for ABEC-2K particles, except that there is an increase in $D_w$ for $TcO_4^{1-}$ anions from NaOH rather than the intermediate maxima observed for ABEC-2K particles. The maximum weight distribution ratios are 7000, 19000, 5200 and 2500 from 5.05 m $(NH_4)_2SO_4$, 5.92 m $K_2CO_3$, 3.14 m $K_3PO_4$, and 8.33 m NaOH, respectively. These values are about two to three times those obtained with ABEC-2K particles, with the maximum $D_w$ values from the $K_2CO_3$ solution as observed for ABEC-2K particles. Interestingly, the dry weight conversion factor of 0.374 for ABEC-5K particles was higher than that for ABEC-2K particles, indicating a lower water content.

The present studies illustrate that dilute anionic dyes, and to a lesser extent neutral and cationic dyes, can be separated from other dye bath constituents, concentrated relative to the initial dilute dye-containing solution, and recovered in concentrated form. These studies also indicate that mixtures of anionic dyes can be separated from each other using a contemplated process so that one dye can be purified from another.

All of the anionic dyes thus far studied in detail, about fifteen, have been successfully separated and recovered.

Dyes containing at least one sulfonate functional group typically provide the highest $D_w$ values and are readily stripped from the separation particles using water. Dyes that contain carboxylate and/or phenoxide functionalities and no sulfonate functionality such as FD&C Red #3 (C.I. 45430) often require the use of an organic solvent for removal from the separation particles.

It is uncertain whether there is a correlation between dye structure, the distribution ratio (D) of a dye in an aqueous liquid/liquid biphase between the salt-rich and PEG-rich layers and the $D_w$ value for that dye obtained using separation particles in a process contemplated here. Initial results, however, indicate that a dye that has a D value of about 5 in an aqueous liquid/liquid biphase distribution process can be separated using a contemplated process. A plot of $D_w$ values versus D values for several dyes provides an approximate $D_w$:D ratio of about 60, indicating that a contemplated process using ABEC-5K is about 60 times more effective in concentrating the dye than is the PEG-containing aqueous liquid/liquid biphase used here for comparison. The correlative uncertainties notwithstanding, a contemplated process provides a means whereby the dye can be readily recovered, whereas aqueous liquid/liquid biphase separations do not do so.

The capacity of the separation particles was found to vary for each dye studied. Anionic dyes were typically bound at about 0.3 to about 5 mmoles per gram dry weight of ABEC-5K separation particles, with tetrasodium nickel phthalocyaninetetrasulfonate being bound only at about $9 \times 10^{-3}$ mmoles per gram dry weight of separation particles. The separation particles typically exhibited much lower capacities for cationic dyes. For example, the capacity of those same ABEC-5K separation particles for the cationic dye Ingrain Blue 1 (C.I. 74240), a copper phthalocyanine derivative, was about $1-5 \times 10^{-5}$ mmoles per gram dry weight and for Auramine O (C.I.41000), another cationic dye, was about $2 \times 10^{-3}$ moles per gram dry weight.

Exemplary data for several dyes studied are provided in Table 3, below.

TABLE 3

| Dye (C.I.) | $D_w{}^1$ | $D^2$ | Capacity[3] (mmol/g) |
|---|---|---|---|
| Ethyl Orange | 1440 | — | 2.35 |
| Reactive Blue 19 (61200) | 1130 | — | — |
| Reactive Blue 4 (61205) | 1630 | q | 2.443 |
| Direct Red 75 (25380) | 2500 | 35 | 0.353 |
| Arsenazo III | 74 | v.h. | — |
| Indigo Carmine (73015) | 8990 | 92 | 0.619 |
| Reactive Red 4 (18105) | 1230 | 3.2 | 0.759 |
| Acid Orange 10 (16230) | 2590 | 51 | — |
| Mordant Violet 5 (15670) | 3610 | 84 | — |
| Acid Yellow 1 (10316) | 1400 | 33 | 1.244 |
| Acid Green 1 (10020) | 5270 | 0.88 | 4.826 |
| Tetrasodium Nickel Phthalocyaninetetrasulfonate | 111 | q | $8.6 \times 10^{-3}$ |
| Pyrocatechol Violet | 1970 | 24 | — |
| Direct Blue 71 (34140) | — | q | 0.346 |
| Acid Red 92 | 916 | 7.8 | 0.594 |

TABLE 3-continued

| Dye (C.I.) | $D_w^1$ | $D^2$ | Capacity[3] (mmol/g) |
|---|---|---|---|
| (45410) | | | |
| Acridine Yellow G (46025) | 525 | q | 3.207 |
| Basic Yellow 2 (41000) | 468 | q | 3.476 |
| Mordant Blue 10 (51030) | 192 | 1.2 | 0.0827 |
| Direct Blue 71 (34140) | — | q | 0.346 |
| Ingrain Blue 1 (74240) | — | — | $1-5 \times 10^{-5}$ |
| Basic Green 4 (42000) | 3460 | 78 | 0.178 |
| Alizarin Complexone dihydrate | 242 | 1.3 | 0.451 |
| Vat Blue 1 (73000) | 5030 | q | — |
| Basic Blue 9 (52015) | 82 | 1.6 | — |
| Salicylic Acid | 271 | 9.36 | — |

[1] Values determined from 1.5M $(NH_4)_2SO_4$ using ABEC-5K separation particles.
[2] Values determined as discussed in Rogers et al., in "Value Adding Through Solvent Extraction", Proceedings of ISEC '96, Shallcross et al., eds., The University of Melbourne, Parkville, Victoria, Australia, vol. 2:1537-1542 (1996); q = quantitative partitioning to PEG-rich phase; v.h. = very high = less than quantitative partitioning to PEG-rich phase.
[3] Capacity determined for ABEC-5K separation particles and reported in mmoles of dye per gram dry weight of those separation particles.

Materials and Methods

Tetraethylene glycol, Me-PEG-350, Me-PEG-750, PEG-2000, Me-PEG-2000, Me-PEG-5000 and chloromethylated polystyrene-1-percent-divinylbenzene beads (Merrifield's peptide resin; 200-400 mesh) were obtained from Aldrich Chemical Co., Inc., Milwaukee, Wis. All were used without further purification. Reagent-grade $(NH_4)_2SO_4$, $K_3CO_3$, $K_3PO_4$, and NaOH were used as received. The reagents and procedures for preparing the Hanford simulated waste solutions have been reported. [Rogers et al., Solvent Extr. Ion Exch., 13:689-713 (1995)] All water was deionized using commercial deionization systems. Dye molecules were purchased from Aldrich, and were used as received.

Synthesis of Chromatographic Materials Williamson Ether Syntheses of ABEC Separation Particles The syntheses of ABEC-0.35K particles and ABEC-0.75K, ABEC-2K, and ABEC-5K separation particles were all carried out in a similar manner and any unique aspects of the individual syntheses will be noted.

Thus, under an Ar atmosphere NaH (0.38 g, 16 mmol) was passed into a 1 L 3-neck flask that was capped and brought out to the bench top. Under a positive flow of Ar the system was equipped with a 400 mL slow addition funnel and a water jacketed reflux condenser. Tetrahydrofuran (THF; about 400 mL) was then transferred to the addition funnel via standard cannula techniques. A portion of the THF (100 mL) was drained into the round-bottom flask in order to suspend the NaH with stirring.

Either Me-PEG-350 (959 μL, 3.0 mmol), Me-PEG-750 (2.25 g, 3.0 mmol), or Me-PEG-5000 (15.0 g, 3.0 mmol) was then added to the addition funnel under a positive Ar flow. The same procedure was utilized in the preparation of ABEC-2K separation particles, except that a 3:1 molar excess of Me-PEG-2000 alkoxide to resin active sites was prepared with NaH (1.07 g, 45 mmol) and Me-PEG-2000 (18.0 g, 9.0 mmol). The Me-PEG-750, Me-PEG-200, and Me-PEG-5000 are solids that were melted into the THF in the addition funnel with the aid of a hot air gun. This solution was then added dropwise over approximately one-half to one hour to the NaH suspension at zero degrees C. Once the addition was complete, the solution was stirred at zero degrees C. for one hour.

The mixture was then warmed to room temperature with stirring, followed by the addition of chloromethylated polystyrene-1-percent-divinylbenzene (3.0 g, 3.0 mmol reactive sites) under a positive Ar flow. The reaction was stirred at 25° C. for one to two hours followed by 36 to 72 hours of refluxing with stirring. The resulting murky solutions were then filtered using a large Büchner funnel, and the resulting solids were exhaustively extracted with THF in a Soxhlet extraction apparatus for 72 hours to remove unbound Me-PEG. The extracted resins were then dried in vacuo and small aliquots were hydrated for the weight distribution ratio studies as needed. Combustion analyses of the precursor chloromethylated polystyrene-1-percent-divinylbenzene and the dry ABEC materials showed a decrease in carbon percentage consistent with the grafting of Me-PEG moieties. Because the Me-PEG molecular weights are average values and the functionalization of the resin is reported as an approximate value, no compositional information other than the observed decrease in carbon percentages can be obtained. Analysis found for chloromethylated polystyrene-1-percent-divinylbenzene: (percent) C, 88.44; H, 7.35. Found for ABEC-0.35K: C, 66.65; H, 6.64. Found for ABEC-0.75K: C, 68.68; H, 7.75. Found for ABEC-2K: C, 67.06; H, 8.62. Found for ABEC-5K: C, 67.78; H, 8.16.

Insoluble Copolymer Beads For Preparation of ABEC Particles

Preparation A

Insoluble, cross-linked copolymer beads (100 g) were prepared by suspension polymerization of 67.47 weight percent vinylbenzyl chloride, 23.03 weight percent styrene, 5.0 weight percent divinylbenzene, and 0.5 weight percent benzoyl peroxide; ethylstyrenes were also present from the technical grade divinylbenzene. To introduce porosity, an equal amount of 1:1 (w/w) mixture of toluene and dodecane was added. The entire polymerization mixture was placed in a cylindrical reactor equipped with overhead stirrer, reflux condenser and thermometer, and was heated at 60° C. for one hour, 70° C. for one hour, 85° C. for two hours and finally at 95° C. for seven hours. Stirring speed was set to 280 rpm.

After polymerization was completed, the resulting cross-linked copolymer beads were separated on sieves, washed with hot water, water and acetone, then preswollen in toluene and extracted with this solvent for eight hours using a Soxhlet apparatus, and then dried. A subsequent nucleophilic reaction using a carbanion as nucleophile indicated that about 1.23 mmol of replaceable chloride per gram dry weight was present in the beads.

Preparation B

Insoluble, cross-linked copolymer beads (70.7 g) were obtained by suspension polymerization of 90.5 weight percent vinylbenzyl chloride, 2.0 weight percent divinylbenzene, and 0.5 weight percent benzoyl peroxide (with the ethylstyrenes present in the technical grade divinylbenzene). A nucleophilic reaction with a carbanion nucleophile indicated the presence of about 1.62 mmol of replaceable chloride per gram dry weight of this resin.

Preparation C

Insoluble, cross-linked copolymer beads (100 g) were obtained by suspension polymerization of 2.0 weight percent of 2-ethyl-(2-hydroxymethyl)-1,3-propanediol trimethacrylate, 97 weight percent of glycidyl methacrylate and 1.0 weight percent of benzoyl peroxide. About 1.3 mmol per gram dry weight of ring-openable epoxide groups were found upon nucleophilic reaction with a carbanion.

Synthesis of Styrene-VBC Xero-gel Cooler

The copolymer beads are prepared by suspension polymerization as follows:

A 1-L three-neck round-bottom flask was equipped with a mechanical stirrer and a condenser. Polyvinyl alcohol (PVA; 1.5 g) was slowly added to 150 mL of deionized (DI) water with stirring. After the PVA was completely dissolved, $CaCl_2 \cdot 2H_2O$ (30 g) was added. When the solution turned clear, tribasic calcium phosphate (1.5 g) was added to the mixture with further stirring. Because calcium phosphate tribasic is insoluble, the final mixture was a cloudy suspension that was stirred gently until used. The combination of PVA and calcium salts stabilizes the ultimately produced resin particles during their formation.

In a 500 mL beaker, 69.80 grams of styrene, 17.26 grams of vinylbenzyl chloride (VBC), 1.64 grams of 55 percent pure divinyl benzene and 1.35 grams of benzoyl peroxide (BPO) were mixed with stirring until the BPO was completely dissolved. The diluent, 60 grams of toluene, was then added to the monomer solution. The copolymer reactants contain 1 percent cross-linking agent and 19.2 percent VBC that contains an active site for the post-functionalization.

The stirring blade was adjusted to a position about half above the surface of the above-prepared aqueous phase. The motor was started and set to stir at a speed of 275 rpm. The organic phase was then slowly poured into the reactor. The admixture was heated to 55° C. in about 15 minutes. The temperature was then slowly increased to 80° C. at a rate 5° C./30 minutes and held at 80° C. for 15 hours. The reaction mixture was thereafter cooled to room temperature.

After the mixture cooled to room temperature, the condenser was replaced with a simple distillation head. Methanol (300 mL) was added and the mixture was heated to a gentle boiling condition. Three hundred mL of distillate were collected. The diluent toluene was azeotroped with water and methanol in this process. The use of methanol or ethanol minimizes foaming when the diluent solvent is being removed. After azeotropic removal of the toluene, the beads were collected, rinsed on a screen with DI water and then dried on a tray at atmospheric pressure.

Synthesis of Xero-gel ABEC Resin

1. Synthesis of Xero-gel ABEC

A 5-L three-neck round-bottom flask was equipped with a mechanical stirrer, a condenser and a nitrogen gas inlet. The reaction was run under a nitrogen flow to dilute the hydrogen produced until the methanol washing step. The xero-gel copolymer (50.04 g) as prepared above and then 2.5 L of tetrahydrofuran (THF) were mixed in the flask, and the mixture was stirred at room temperature for one hour. The resin was fully swollen in this hour.

Monomethyl-PEG-5000 (525 g) was added to the flask and the mixture was then heated to 45°–50° C. to dissolve the PEG. The admixture was cooled to about 30° C., and 21.62 grams of NaH (60 percent pure, dispersed in mineral oil) were added very slowly. That mixture was heated at reflux for 17 hours, and then permitted to cool. After the mixture cooled to room temperature, 250 mL of methanol were added through an addition funnel over a period of 30–45 minutes to react the unreacted NaH. The formed ABEC resin was then washed with 1 liter of methanol, 50 percent aqueous methanol, and water. Finally, the resin was transferred to a column and conditioned with 5 liters of DI water.

Different separation particles were prepared from different types of starting copolymers. Several characteristics of these particles are listed in Table 4 below. The high yield of xero-gel-ABEC is thought to be due to the internal surface area of a fully swollen xero-gel resin being much greater than another type of support.

TABLE 4

| Type of Resin | Crosslinking (% by weight) | Yield of ABEC[1] | Final size (Mesh) |
| --- | --- | --- | --- |
| Xero Gel | 1 | 125 g | 40–60 |
| Regular Gel | 1 | 50 g | 20–50 |
| Merrifield Resin | 1 | 75 g | 100–200 |
| Commercial macroreticular | 6 | 17 g | 20–50 |
| Lab. Prepared Macroreticular | 12 | 20 g | 40–60 |

[1]Yield based on 10 g of starting copolymer.
[2]Provided by Sybron Chemical, chloromethylated from polystyrene.

Preliminary $D_w$ data using $^{99}TcO_4^{1-}$ separations indicate that regular gel-, xero-gel- and Merrifield resin-based separation particles having WCF values of about 0.12 to about 0.2 exhibited $D_w$ values about $10^1$–$10^2$ times greater than $D_w$ values obtained using macroreticular resin-based separation particles having WCF values of about 0.64–0.78. These differences in $D_w$ values were observed in aqueous 2 and 6 molal $K_2CO_3$ solutions.

Chaotropic Metal Anion and Uptake Studies

All separation particles were stored in tightly capped containers and were not exposed to air for any extensive period of time so as to avoid a change in water content. All weight distribution ratios were radiometrically determined by batch contacts of the resin with the desired analyte-containing solution. The dry weight distribution ratio is defined as:

$$D_w = [(A_o - A_f)/A_f][V/(m_R \cdot wcf)]$$

where $A_o$=the activity of the solution prior to contact with the resin, $A_f$=the activity of the solution after contact with resin, V=volume (mL) of solution contacted with resin, $m_R$=mass (g) of resin, and wcf=the dry weight conversion factor relating the mass of the hydrated resin to its dry weight.

The $D_w$ studies were carried out in the following manner. The radiotracer was added to 1.2 mL of the solution of interest, gently mixed, and a 100 μL aliquot was removed for radiometric counting to determine the initial activity of the solution ($A_o$). One mL of the remaining solution (V) was added to a known mass of hydrated resin ($m_R$) and centrifuged for one minute. The solution was then stirred gently (so that the resin was just suspended in the solution) for 30 minutes, followed by one minute of centrifugation, and another 30 minutes of stirring. After one additional minute of centrifugation, the solution was pipeted away from the resin and filtered through a 45 μm pipet-tip filter so that any suspended resin would be removed. A 100 μL aliquot was then removed for counting the final activity of the solution ($A_f$).

Procedure for the $^{99m}TcO_4^{1-}/^{99}MoO_4^{2-}$ Separation Using ABEC-5K as Solid Support A disposable plastic column equipped with a Luer-lock stopcock and porous plastic bed support was slurry packed with ABEC-5K separation particles in water and backwashed. A porous plastic frit was placed on top of the bed to prevent its disruption during the addition of eluent. The bed volume was 1.63 mL and the free column volume (fcv) was determined by $^{99}MoO_4^{2-}$ breakthrough. The fcv of 0.392 mL was comparable to that obtained using a sodium breakthrough/flame test. All eluate volumes were calculated gravimetrically using the respective solution densities.

The ABEC-5K separation particle-containing column was equilibrated with 5.00 mL (12.8 fcv) of 5.0M NaOH. Thereafter, 11.2 mL (28.6 fcv) of $Na_2^{99}MoO_4$ in 5.0M NaOH was eluted on the column using gravity flow (<0.3 mL/minute). Prior to rinsing, the reservoir was washed three times with 3 mL of $K_2CO_3$ to remove residual $Na_2^{99}MoO_4$. The column was rinsed of $Na_2^{99}MoO_4$ by elution with 4.3 mL (11.0 fcv) of 3.0M $K_2CO_3$.

Water [13.3 mL (33.0 fcv)] was passed into the column and over the resin to remove the $Na^{99m}TcO_4$. Activity was observed in the eluate after several fcv indicating that $^{99m}TcO_4^{1-}$ anion was being removed. The water strip was accompanied by a 30 percent swelling of the resin.

The total γ activity of $^{99}MoO_4^{2-}$ ions eluted on the column was $5.19 \times 10^6$ cpm. The sum of the activity of $^{99m}TcO_4^{1-}$ anions stripped from the column was $1.97 \times 10^7$ cpm. (The $^{99m}Tc$ activity is higher than the $^{99}Mo$ due to the higher conversion to γ for the $^{99m}Tc$ nuclide.) From 49–54 fcv, $1.79 \times 10^7$ cpm of $^{99m}TcO_4^{1-}$ were collected, which corresponds to 91 percent of the $^{99m}Tc$ activity being recovered in five fcv (1.96 mL).

Figure 6:
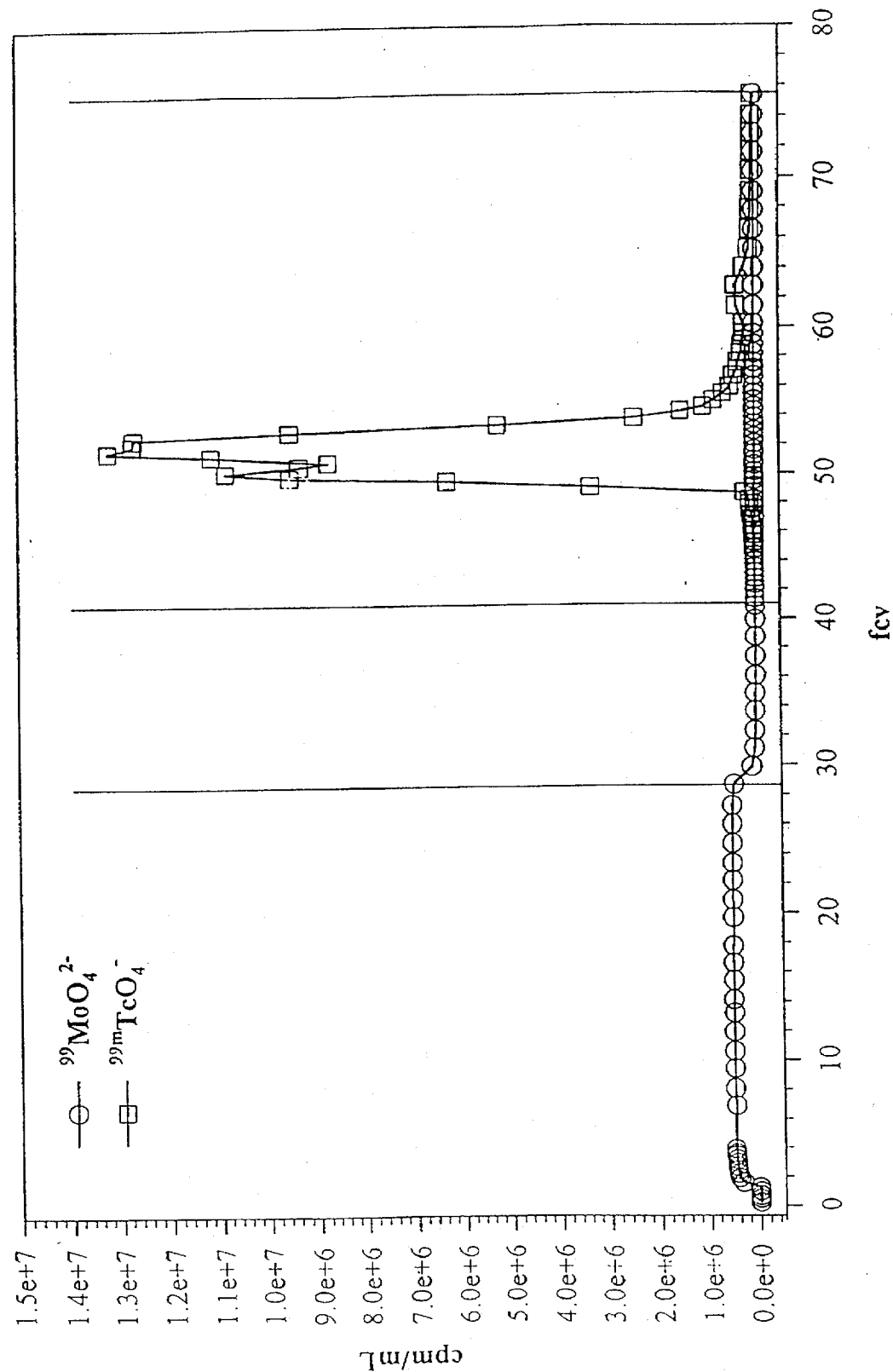
FIG. 6 shows the results of a separation and recovery process for the inorganic chaotropic anion $TcO_4^{1-}$ using ABEC-5K separation particles at 22° C. Counts per minute per milliliter (cpm/mL) with the exponent shown are plotted on the ordinate for $^{99}MoO_4^{2-}$ (open circles) and $^{99m}TcO_4^{1-}$ (open squares). Free column volumes (fcv) of eluate are plotted on the abscissa. The column was loaded for about 29 fcv with 5M NaOH, thereafter washed with 3M $K_2CO_3$ for about 13 fcv and then stripped using water for about another 34.5 fcv. The column had a fcv of 0.392 mL.

An exemplary plot of the elution of $^{99}MoO_4^{2-}$ and $^{99}Tc_4^{1-}$ anions from this column is shown in FIG. 6. Smaller samples of eluate were taken at the beginning and end of peaks on the chromatogram, whereas larger cuts were sampled during plateaus. As a result, the ordinate of the chromatogram has units of cpm/mL so that all activities are on a uniform scale.

Following breakthrough, the $^{99}MoO_4^{2-}$ anions eluted steadily forming a plateau during the load phase. The $K_2CO_3$ rinse showed a steady drop in $^{99}MoO_4^{2-}$ anion activity and reached background after seven fcv. The water strip showed $^{99m}TcO_4^{1-}$ anions coming off after eight fcv, and this peak showed some tailing and split peaks that are as yet unexplained.

Dry Weight Conversion Factor

Weight conversion factors that are a measure of the wettability of separation particles and figure in $D_w$ calculations are determined as follows.

A sample of separation particles is hydrated in an excess of water for 30 minutes at room temperature, and then filtered on a Büchner funnel and dried in place with a stream of water-saturated air for 5 minutes at a pressure of about 660–670 torr. A portion of that air-dried material is removed, weighed and then dried in an oven at 110° C. until a constant mass was obtained. The dry mass of the separation particles divided by the mass of air-dried separation particles provided the dry weight conversion factor. Each gravimetric analysis was performed in duplicate, and was repeated each time a new batch of hydrated separation particles was prepared.

Weight Distribution and Percent $CH_2O/mm^2$ Surface Area $D_w$ values were determined for $TcO_4^{1-}$ ions in 5.92 m $K_2CO_3$ solution using ABEC-0.35K, ABEC-0.75K, ABEC-2K, ABEC-5K and ABEC-5.75K separation particles prepared from 200–400 mesh Merrifield's peptide resin (polystyrene-1 percent-divinylbenzene) precursor particles. The unreacted particles were also assayed.

Figure 7:
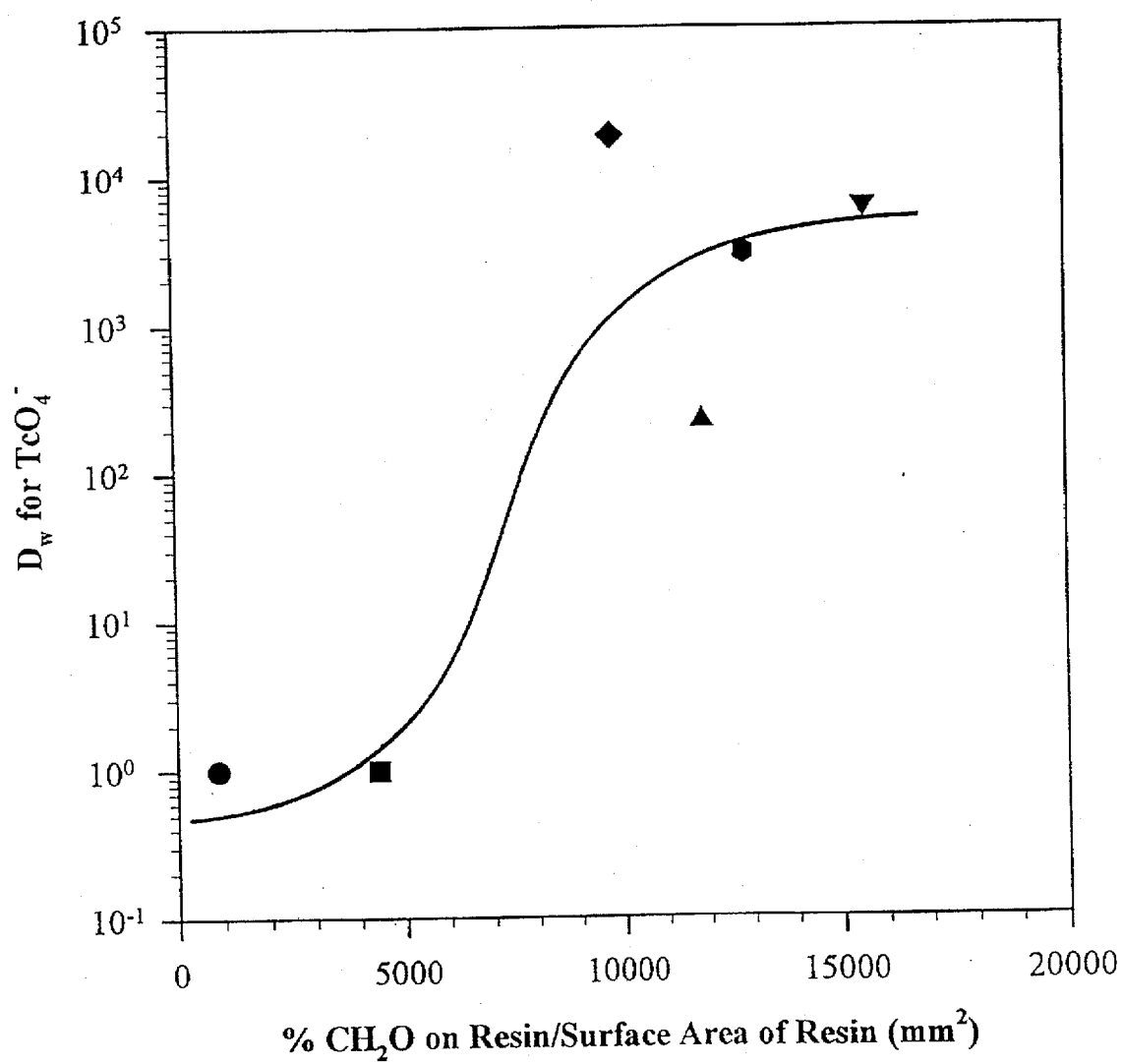
FIG. 7 is a graph showing $D_w$ values for $TcO_4^{1-}$ ions in 5.9 m $K_2CO_3$ at 25° C. versus percent $CH_2O/mm^2$ of particle surface for various particles. Those particles were: Merrifield's peptide resin used herein (darkened circle); ABEC-0.35K particles (darkened square); ABEC-0.75K separation particles (darkened triangle); ABEC-2K separation particles (darkened inverted triangle); ABEC-5K separation particles (darkened diamond) and ABEC-5.75K separation particles (darkened hexagon).

The results are shown in FIG. 7 plotted against the percent $CH_2O/mm^2$ particle surface area. As is seen from the data, $D_w$ values of about 100 or more that indicate useful materials occur at $CH_2O/mm^2$ values greater than about 8000. Similar results apply using anionic dye molecules as chaotrope.

Anionic Dye Studies

Procedure For Column Studies

Standard curves were made for each dye by preparing four solutions of known concentrations in deionized water, and determining absorbances at $\lambda_{max}$ on a Milton Roy spectronic 21 D UV-Visible spectrophotometer. $\lambda_{max}$ values were obtained from *The Sigma-Aldrich Handbook of Stains, Dyes and Indicators*, F. J. Green, Aldrich Chemical Company, Inc., Milwaukee, Wis. (1991), or by scanning the absorbance in the 280–800 nm region. A plot of absorbance vs. concentration yields a straight line that was fit by linear regression (Sigma Plot). This equation was then used to determine the concentration of the unknown dye solutions from their absorbance.

The feed solutions were prepared by adding an excess amount of dye to 1.5M $(NH_4)_2SO_4$, stirring for 10 minutes, and then filtering (Whatman® #2 filter paper) to yield a saturated dye solution. The concentration of this solution was then determined by measuring its absorbance (at $\lambda_{max}$) and using the standard curve to calculate the concentration.

Small columns (Isolab Practi-column™ 10 mm OD, 100 mm length) were prepared separately for each study. Approximately 0.5 g of ABEC-5K resin prepared as described before using Merrifield's peptide resin were slurry-packed with water in each column. Because the separation particles (resin) have a variable water content, depending upon conditioning of the resin and humidity, the weight of resin used was converted to a dry weight by multiplying the weight of resin used by its dry weight conversion factor. The dry weight conversion factor was calculated for each lot by gravimetric analysis. The packed column was then sonicated for 20 minutes to ensure good packing of the resin and to prevent channeling. A small porous disk was placed on top of the resin bed to hold it in place. Before use, each column was equilibrated by eluting 20–25 free column volumes (fcv's) of 1.5M $(NH_4)_2SO_4$.

The fcv was determined by $^{22}Na$ breakthrough as follows: The equilibrating solution was eluted until the solution was level with the top of the resin bed. A $^{22}NaCl$-spiked 1.5M $(NH_4)_2SO_4$ solution of approximately 1 mL was then added to the column. The spiked solution was then eluted through the column, collecting 2-drop samples. The samples were then counted on a Packard Cobra II™ gamma counter. The sum of the sample volumes up to the first appearance of $^{22}Na$ activity minus the void volume yields the free column volume. The dead volume is the volume occupied from the bottom of the resin bed to the bottom of the column's stopcock. $^{22}Na$ was used in this study because it is not retained by the resin.

The column was then mounted on a Bio-Rad model 2110 fraction collector and the feed solution was eluted (gravity flow) at a rate of approximately 1 mL/minute, collecting approximately 3 mL samples. The flow rates typically slowed to 0.5–0.25 mL/minute as the column approached capacity. The feed solution was loaded into the packed column until a strong dye color was visible in the eluate at which time a rinse solution [3M or 1.5M $(NH_4)_2SO_4$] was added to the column. The column was rinsed with this solution until no dye color was visible in the eluate. (Sample volumes collected during the rinse varied from 3 mL to about 500 mL depending on the behavior of the dye.)

The column was then stripped by eluting with deionized water, an aqueous solution that does not contain a poly (ethylene glycol) liquid/liquid biphase-forming amount of a lyotropic salt. During the strip, smaller sample volumes were collected (3–4 drops). In some cases, the dye left a visible stain on the resin. For these stained columns, an additional strip with methanol was utilized to help remove the dye from the column. The identities of the staining materials have not determined, but those materials are believed to be different from the dye eluted with water.

The concentration of dye in all of the samples was determined by measuring absorbance at $\lambda_{max}$, and using the standard curve. Because the sample volumes collected were not equal, the chromatographs were plotted as the concentration of dye in the collected sample (moles/L) per mL of eluate collected vs. the total number of free column volumes eluted.

The data used for FIGS. 1–5 were obtained using the above procedures.

Columns were prepared in the same manner as above except that 0.25 g of resin was used for Ethyl Orange, Acid Red 92, Direct Blue 71 and Direct Red 75. The feed solution was added to the column by use of a Cole-Palmer Masterflex™ peristaltic pump. The flow rate during the capacity study was between 5–10 mL/minute but again, slowed as the column reached capacity.

For Ethyl Orange, Acid Red 92 and Direct Blue 71, the eluate was re-used as the solvent to prepare additional feed. Aliquots of the eluate were collected and the concentration of the sample was determined spectrophotometrically.

Capacity of the column was reached when the concentration of dye in the eluate was equal to the concentration of dye in the feed. At this point the feed solution was replaced with a 3M $(NH_4)_2SO_4$ rinse solution. For Basic Yellow 2 and Acid Yellow 1, the molarity was switched to 1.5M $(NH_4)_2SO_4$ until the dye concentration in the rinse eluate was near zero, then switched back to 3M. The rinse eluate was monitored in the same way as the feed. When the concentration of dye in the eluate was zero, the column was stripped with deionized water. For dyes that stained the resin, a small portion (2–3 mL) of methanol was used in the strip. The concentration of dye in the strip was determined from its absorbance at $\lambda_{max}$, and the capacity was calculated as mmoles of dye per gram of dry resin.

Separation of Food Colorings Using ABEC Resins

A small glass column was packed with ABEC-5K, as above, in water to a bed height of 8.6 cm. (The bed height in 1.5M $(NH_4)_2SO_4$ was 7 cm). The free column volume was estimated to be 2 mL based on similarly packed columns with bed heights of 1.7 cm (water) and 1.3 cm (1.5M $(NH_4)_2SO_4$). The column was equilibrated with 20 mL of the 1.5M $(NH_4)_2SO_4$ solution.

Three food colorings were chosen for this separation study. The dyes, obtained from a local grocery store, were packaged under the brand name McCormick Colors & Egg Dyes by McCormick & Co., Inc., Hunt Valley Md. The blue, red, and yellow dyes utilized in the study contained FD&C Yellow 5 (C.I. 19140), FD&C Red 40 (C.I. 16035), FD&C Blue 1 (C.I. 42090), and FD&C Red 3 (C.I. 45430).

The maximum absorptions for each dye were determined by scanning the UV/visible light range of 800–300 nm. The yellow maximum appeared at 426 nm, red at 490 nm, and blue at 630 nm. The blue dye appeared to be a mixture of at least two different dyes; one with a $\lambda_{max}$ at 630 nm (C.I. 42090), another with a $\lambda_{max}$ at 532 nm (C.I. 45430). The red and yellow maxima overlapped. However, those dyes were sufficiently separated during the column run. The blue dye also had minor peaks that overlapped with the red and yellow dyes.

The feed solution was prepared by adding 1 drop of each food dye to 50 mL of 1.5M $(NH_4)_2SO_4$. The feed solution (2 mL) was added to the top of the ABEC column and eluted. A very small band of a dark green color was visible at the top of the column. The column was rinsed with 24 mL of 1.5M $(NH_4)_2SO_4$. During the rinse, a yellow color moved down the column about 0.1 cm.

The column was then stripped by elution with water, and the eluate was scanned using a UV spectrometer. During the strip, all of the color in the original light band at the top of the column was removed except for a small pink band that remained at the top of the column. The pink band (C.I. 45430) was eluted with methanol.

During the strip step, the yellow color eluted first, followed by the blue, and finally the red colors. In this unoptimized study, there was good separation between the yellow and blue colors. The red and blue colors were less well resolved. These separations nonetheless illustrate how a contemplated process can be used to purify anionic dyes.

The Procedure For Weight Distribution Ratio (Dw) Measurements

A known amount of dye was dissolved in aqueous 1.5M $(NH_4)_2SO_4$ solution, and diluted to a dye concentration of about $10^{-6}$M with 1.5M $(NH_4)_2SO_4$. The absorbance of the resulting dye solution was measured with a Milton Roy Spectronic 21 D UV-Visible spectrometer using 1.5M $(NH_4)_2SO_4$ as reference. The dye solution (3 mL) was contacted with about 0.04 g of resin and stirred for 30 minutes, centrifuged, vortexed, and centrifuged again followed by another 30 minutes of stirring, then centrifuged. The solution was separated from the resin and was used for the absorption measurement. The wavelength used for each dye was the $\lambda_{max}$ from the *The Sigman-Aldrich Handbook of Stains, Dyes and Indicators*. The $D_w$ was calculated by the following equation:

$$D_w = [(A_0 - A_f)/A_f][V/(m_R \cdot wcf)]$$

$A_0$ is the absorbance of the dye solution before contact with resin, $A_f$ is the absorbance of the dye solution after contact with resin, V is the volume of the dye solution used to contact resin, $m_R$ is the mass of the resin used to contact dye solution and wcf is the weight conversion factor for the resin.

The Procedure For Distribution Ratio (D) Measurements

A dye solution [3 mL of about $10^{-6}$M in 1.5M $(NH_4)_2SO_4$] was combined with 3 mL 40% PEG-2000 solution in a flat bottom tube, then the mixture was vortexed for 2 minutes and centrifuged. The phase ratio and the phase volume were measured. The salt-rich phase was separated from the PEG-rich phase.

The absorbances of the dye stock solution and the salt-rich phase were measured using the same UV-Visible spectrometer with 2.5M $(NH_4)_2SO_4$ as the reference. [The study shows no difference of this $(NH_4)_2SO_4$ reference and a salt-rich phase from an aqueous two-phase system.] The wavelength used for each dye is the $\lambda_{max}$ from the *The Sigma-Aldrich Handbook of Stains, Dyes and Indicators*. The distribution ratios for dyes were calculated as following:

$$D = [dye]_p/[dye]_s = (3I_0/I_s - V_s)/V_p$$

$[dye]_p$ and $[dye]_s$ represent the concentration of dye in PEG-rich phase and salt-rich phase, respectively. $I_0$ is the absorbance of the dye stock solution, $I_s$ is the absorbance of the salt-rich phase, $V_s$ and $V_p$ are the volumes of the salt-rich phase and the PEG-rich phase, respectively.

The foregoing description and the examples are intended as illustrative and are not to be taken as limiting. Still other variations within the spirit and scope of this invention are possible and will readily present themselves to those skilled in the art.

We claim:

1. A process for separating and recovering an anionic dye from an aqueous solution that comprises the steps of:

(a) contacting separation particles with an aqueous solution containing (i) an anionic dye and (ii) a poly(ethylene glycol) liquid/liquid biphase-forming amount of a dissolved salt to form a solid/liquid phase admixture, said anionic dye containing a 5- or 6-membered aromatic ring and at least one substituent group having a $pK_a$ value equal the pH value of said aqueous solution, said separation particles comprising particles having a plurality of covalently bonded —X—$(CH_2CH_2O)_n$—$CH_2CH_2R$ groups wherein X is O, S, NH or N—$(CH_2CH_2O)_m$—$R^3$ where m is a number having an average value of zero to about 225, n is a number having an average value of about 15 to about 225, $R^3$ is hydrogen, $C_1$–$C_2$ alkyl, 2-hydroxyethyl or $CH_2CH_2R$, and R is selected from the group consisting of —OH, $C_1$–$C_{10}$ hydrocarbyl ether having a molecular weight up to about one-tenth that of the —$(CH_2CH_2O)_n$— portion, carboxylate, sulfonate, phosphonate and —$NR^1R^2$ groups where each of $R^1$ and $R^2$ is independently hydrogen, $C_2$–$C_3$ hydroxyalkyl, $C_1$–$C_6$ alkyl, or —$NR^1R^2$ together form a 5- or 6-membered cyclic amine having zero or one oxygen atoms or zero or one additional nitrogen atoms in the ring, said separation particles having a percent $CH_2O/mm^2$ of particle surface area of greater than about 8000 and less than about 1,000,000;

(b) maintaining said contact for a time period sufficient to form anionic dye-bound separation particles and an aqueous solution having a reduced concentration of anionic dye;

(c) contacting said anionic dye-bound separation particles of step (b) with a second aqueous solution that does not contain a poly(ethylene glycol) liquid/liquid biphase-forming amount of dissolved salt to free the anionic dye from the separation particles and form an aqueous solution containing free anionic dye; and (d) recovering the anionic dye containing aqueous solution of step (c).

2. The process according to claim 1 wherein n has an average value of about 40 to about 130.

3. The process according to claim 1 wherein R is a $C_1$–$C_{10}$ hydrocarbyl ether group.

4. The process according to claim 1 wherein said percent $CH_2O/mm^2$ of particle surface area is about 9,000 to about 20,000.

5. The process according to claim 4 wherein said poly(ethylene glycol) liquid/liquid biphase-forming dissolved salt has an ammonium or alkali metal cation and an anion selected from the group consisting of carbonate, sulfate, phosphate and chloride.

6. The process according to claim 1 wherein said particles are reacted cross-linked poly(styrene-vinyl benzyl halide) particles.

7. The process according to claim 1 including the further step of separating said anionic dye-bound separation particles from the aqueous solution of step (b) prior to step (c), said separation being carried out in the presence of an aqueous solution of a poly(ethylene glycol) liquid/liquid biphase-forming amount of a salt to form a second solid/liquid phase admixture containing anionic dye-bound separation particles.

8. A process for separating and recovering anionic dye molecules from an aqueous solution that comprises the steps of:

(a) contacting separation particles with an aqueous solution containing (i) anionic dye molecules and (ii) a poly(ethylene glycol) liquid/liquid biphase-forming amount of a dissolved lyotropic salt to form a solid/liquid phase admixture, said anionic dye molecules containing at least two 5- or 6-membered aromatic rings and at least one substituent group having a $pK_a$ value one unit below the pH value of said aqueous solution, said separation particles comprising reacted cross-linked poly(styrene-vinyl benzyl halide) particles having a plurality of covalently bonded —X—$(CH_2CH_2O)_n$—$CH_2CH_2R$ groups wherein X is O, S, NH or N—$(CH_2CH_2O)_m$—$R^3$ where m is a number having an average value of zero to about 225, n is a number having an average value of about 40 to about 130, $R^3$ is hydrogen, $C_1$–$C_2$ alkyl, 2-hydroxyethyl or $CH_2CH_2R$, and R is a $C_1$–$C_{10}$ hydrocarbyl ether having a molecular weight up to about one-tenth that of the —$(CH_2CH_2O)_n$— portion, said separation particles having a percent $CH_2O/mm^2$ of particle surface area of greater than about 9000 and to about 20,000;

(b) maintaining said contact for a time period sufficient to form anionic dye molecule-bound separation particles and an aqueous solution having a reduced concentration of anionic dye molecules;

(c) separating said anionic dye molecule-bound separation particles from the aqueous solution of step (b) in the presence of an aqueous solution of a poly(ethylene glycol) liquid/liquid biphase-forming amount of a salt to form a second solid/liquid phase admixture containing anionic dye molecule-bound separation particles;

(d) contacting said anionic dye molecule-bound separation particles of step (c) with second aqueous solution that does not contain a poly(ethylene glycol) liquid/liquid biphase-forming amount of dissolved salt to free the anionic dye molecules from the separation particles and form an aqueous solution containing free anionic dye molecules at a higher concentration than that of said first-named aqueous solution of step (a); and (e) recovering the anionic dye molecule-containing aqueous solution of step (d).

9. The process according to claim 8 wherein X is O.

10. The process according to claim 9 wherein said poly(ethylene glycol) liquid/liquid biphase-forming dissolved salt has an ammonium or alkali metal cation and an anion selected from the group consisting of hydroxide, fluoride, carbonate, silicate, sulfate, phosphate, formate, acetate, succinate, tartrate, citrate, chromate, molybdate, tungstate, orthovanadate, chloride, thiocyanate, thiosulfate, fluorosilicate, orthosilicate, hydroxyethane-1,1-diphosphonate, vinylidene-1,1-diphosphonate and the protonated anionic forms thereof.

11. The process according to claim 10 wherein said anionic dye molecules contain at least one sulfonate functional group.

12. A process for recovering anionic dye molecules from an aqueous solution that comprises the steps of:

(a) contacting separation particles with an aqueous solution containing (i) anionic dye molecules and (ii) a poly(ethylene glycol) liquid/liquid biphase-forming amount of a dissolved lyotropic salt to form a solid/liquid phase admixture, said anionic dye molecules containing at least two 5- or 6-membered aromatic rings and at least one sulfonate substituent group, said separation particles comprising reacted cross-linked poly(styrene-vinyl benzyl halide) particles having a plurality of covalently bonded —O—(CH$_2$CH$_2$O)$_n$—CH$_2$CH$_2$R groups wherein n is a number having an average value of about 40 to about 130, and R is a C$_1$–C$_{10}$ hydrocarbyl ether having a molecular weight up to about one-tenth that of the —(CH$_2$CH$_2$O)$_n$— portion, said separation particles having a percent CH$_2$O/mm$^2$ of particle surface area of greater than about 9000 and to about 20,000;

(b) maintaining said contact for a time period sufficient to form anionic dye molecule-bound separation particles and an aqueous solution having a reduced concentration of anionic dye molecules;

(c) separating said anionic dye molecule-bound separation particles from the aqueous solution of step (b) in the presence of an aqueous solution of a poly(ethylene glycol) liquid/liquid biphase-forming amount of a salt to form a second solid/liquid phase admixture containing anionic dye molecule-bound separation particles;

(d) contacting said anionic dye molecule-bound separation particles of step (c) with second aqueous solution that does not contain a poly(ethylene glycol) liquid/liquid biphase-forming amount of dissolved salt to free the anionic dye molecules from the separation particles and form an aqueous solution containing free anionic dye molecules at a higher concentration than that of said first-named aqueous solution of step (a); and (e) recovering the anionic dye molecule-containing aqueous solution of step (d).

* * * * *